(12) United States Patent
Shults et al.

(10) Patent No.: US 11,034,020 B2
(45) Date of Patent: Jun. 15, 2021

(54) SYSTEMS AND METHODS FOR ENHANCED REVIEW OF AUTOMATED ROBOTIC SYSTEMS

(71) Applicant: RavenOPS, Inc., San Francisco, CA (US)

(72) Inventors: Randall Shults, San Francisco, CA (US); Christopher Post, San Francisco, CA (US); Joshua Ouellette, San Francisco, CA (US); Delaney Gillilan, San Francisco, CA (US); Thomas Balough, San Francisco, CA (US); Sasha Pozdnyakova, St. Petersburg (RU)

(73) Assignee: RavenOPS, Inc., San Francisco, CA (US)

( * ) Notice: Subject to any disclaimer, the term of this patent is extended or adjusted under 35 U.S.C. 154(b) by 208 days.

(21) Appl. No.: 16/199,628

(22) Filed: Nov. 26, 2018

(65) Prior Publication Data

US 2020/0164509 A1    May 28, 2020

(51) Int. Cl.
*B25J 9/16* (2006.01)
*G05B 19/02* (2006.01)
*B23Q 35/128* (2006.01)

(52) U.S. Cl.
CPC .......... *B25J 9/1656* (2013.01); *B23Q 35/128* (2013.01); *G05B 19/02* (2013.01)

(58) Field of Classification Search
None
See application file for complete search history.

(56) References Cited

U.S. PATENT DOCUMENTS

| | | | |
|---|---|---|---|
| 9,767,369 B2* | 9/2017 | Furman | H04N 19/117 |
| 9,853,905 B2* | 12/2017 | Chen | H04W 8/24 |
| 10,209,915 B2* | 2/2019 | Yun | G06F 3/0643 |
| 2003/0080878 A1* | 5/2003 | Kirmuss | B60R 11/02 340/936 |
| 2016/0294707 A1* | 10/2016 | Chen | H04L 67/12 |
| 2018/0050800 A1* | 2/2018 | Boykin | H04N 21/435 |
| 2019/0110020 A1* | 4/2019 | Zhang | H04N 5/23232 |
| 2019/0385383 A1* | 12/2019 | Sato | G07C 5/0866 |
| 2020/0156651 A1* | 5/2020 | Golov | G05D 1/0077 |

* cited by examiner

*Primary Examiner* — Peter D Nolan
*Assistant Examiner* — Demetra R Smith-Stewart
(74) *Attorney, Agent, or Firm* — Foley & Lardner LLP

(57) ABSTRACT

The system described herein can reduce network bandwidth usage when prioritizing data from an autonomous robotic system. The autonomous robotic system can identify predetermined events in data stream and extract portions of the data streams that include the events. The system can reduce network bandwidth usage by prioritizing transmission of only the extracted portions of the data streams rather than the full, raw data streams.

20 Claims, 13 Drawing Sheets

SYSTEMS AND METHODS FOR ENHANCED REVIEW OF AUTOMATED ROBOTIC SYSTEMS

BACKGROUND OF THE DISCLOSURE

Robots can include a wide variety of sensors to perceive or sense the robot's external environment. For example, the robots can utilize task specific sensors, cameras, or LIDAR systems. Robots can be autonomous and can independently generate responses to objects and events in the robot's external environment.

SUMMARY OF THE DISCLOSURE

During operation autonomous robotic systems can generate large amounts of data. For example, an autonomous car can generate between about 4 Tb and about 7 Tb of data per hour of operation. The present solution can provide a platform that enables autonomous systems to identify events within the large data streams and triage and prioritize the identified events and data for further review and analysis. The present solution can also enable the autonomous system to identify events within the data streams and compress the data for transmission to remote devices or for storage on the autonomous system.

According to at least one aspect of the disclosure, a system can include at least one autonomous system. The system can be configured for transmitting and reviewing event information in automated robotic systems. The autonomous system can be an autonomous vehicle, for example, and can include a plurality of sensors. The autonomous systems can include fully or partially autonomous trucks, cars, drones, stationary arms, robots, warehouse robots, delivery robots, and service robots. The autonomous system can include a data processing system that includes a memory and one or more processors. The data processing system can receive a first data stream from a first of the plurality of sensors. The data processing system can receive a second data stream from a second of the plurality of sensors. The data processing system can determine that a usage parameter of the data processing system falls below a predetermined threshold. Responsive to the usage parameter of the data processing system falling below the predetermined threshold, the data processing system can detect an event in the first data stream. The data processing system can extract a portion of the first data stream that includes the event and a portion of the second data stream that includes the event. The data processing system can generate a third data stream based on the portion of the first data stream covering the event and the portion of the second data stream that includes the event. The data processing system can transmit the third data stream to a remote data processing system.

In some implementations, the data processing system can determine a network parameter of a network between the autonomous system and the remote data processing system. The data processing system can transmit the third data stream to the remote data processing system based on the network parameter being above a second threshold. The usage parameter can include at least one of a current status of the autonomous system, a processor utilization value, available memory, or power level. The usage parameter can indicate a predicted usage parameter for a predetermined time in the future.

In some implementations, the data processing system can compress the portion of the first data stream that includes the event. The data processing system can compress the portion of the second data stream that includes the event. The data processing system can generate the third data stream based at least on the compressed portion of the first data stream that includes the event and the compressed portion of the second data stream that includes the event.

In some implementations, the data processing system can sync the first data stream and the second data stream to a master clock. The third data stream can include a visualization based on the portion of the first data stream that includes the event and the portion of the second data stream that includes the event. The portion of the first data stream that includes the event can include a first portion of the first data stream prior to the event and a second portion of the first data stream after the event.

In some implementations, the data processing system can transmit the first data stream and the second data stream to the remote data processing system. The data processing system can receive a fourth data stream from a client device and generate the third data stream based on the fourth data stream.

According to at least one aspect of the disclosure, a method to identify and review events in data generated by an autonomous system can include receiving, by a data processing system of an autonomous system, a first data stream from a first of a plurality of sensors. The method can include receiving, by the data processing system, a second data stream from a second of the plurality of sensors. The method can include determining, by the data processing system, that a usage parameter of the autonomous system falls below a predetermined threshold. The method can include detecting an event in the first data stream based on the usage parameter falling below a predetermined threshold. The method can include extracting a portion of the first data stream that includes the event and a portion of the second data stream that includes the event. The method can include generating a third data stream based on the portion of the first data stream including the event and the portion of the second data stream time that includes the event. The method can include transmitting the third data stream to a remote data processing system.

In some implementations, the method can include determining a network parameter of a network between the autonomous system and the remote data processing system. The method can include transmitting the third data stream to the remote data processing system based on the network parameter being above a second threshold.

The usage parameter can include at least one of a current status of the autonomous system, a processor utilization value, available memory, or power level. The usage parameter can indicate a predicted usage parameter for a predetermined time in the future.

In some implementations, the method can include compressing the portion of the first data stream that includes the event. The method can include compressing the portion of the second data stream that includes the event. The method can include generating the third data stream based at least on the compressed portion of the first data stream that includes the event and the compressed portion of the second data stream that includes the event.

In some implementations, the method can include syncing the first data stream and a second data stream to a master clock. In some implementations, the third data stream can include a visualization based on the portion of the first data stream that includes the event and the portion of the second data stream that includes the event. In some implementations, the extracted portion of the first data stream can include a first portion of the first data stream prior to the event and a second portion of the first data stream after the event.

In some implementations, the method can include transmitting the first data stream and the second data stream to the remote data processing system. The method can include receiving a fourth data stream from a client device. The method can include generating the third data stream based on the fourth data stream.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

A. Systems and Methods for Reviewing and Prioritizing Event Information in Automated Robotic Systems While an autonomous system is operating, the autonomous system can generate large amounts of data, which can be referred to as data streams. For example, an autonomous car can generate between about 4 Tb and about 7 Tb of data per hour of operation. The storage capacity of the autonomous system can prevent the data streams from being stored locally at the autonomous systems. However, while in operation, an autonomous system may have a relatively low bandwidth connection (or only intermittent connection) back to a central storage repository or other devices, which can prevent the autonomous system from transmitting data to the central storage repository or other device.

The system described herein can reduce network bandwidth usage when transmitting data from an autonomous system to another device. The system can enable the autonomous system to identify predetermined events in the data stream and extract the portions of the data streams that include the events. For example, data from a self-driving car making a left hand turn across traffic may be an example event. The autonomous system can extract the portions of the data streams related to making the left hand turn from portions of the data streams that include mile after mile of cruising down a well-traveled highway. The system can reduce network bandwidth usage by transmitting only the extracted portions of the data streams rather than the full, raw data streams. In some implementations, the autonomous system can generate low-fidelity versions of the data streams that are transmitted to the other devices. The low-fidelity versions of the data streams can have a smaller file size when compared to the full, raw data streams. In some implementations, the autonomous system can combine data streams to generate new data streams (or visualization) that the autonomous system can transmit to the remote devices. The new data streams can have smaller file size when compared to the summed file size of each of the full, raw data streams.

Figure 1:
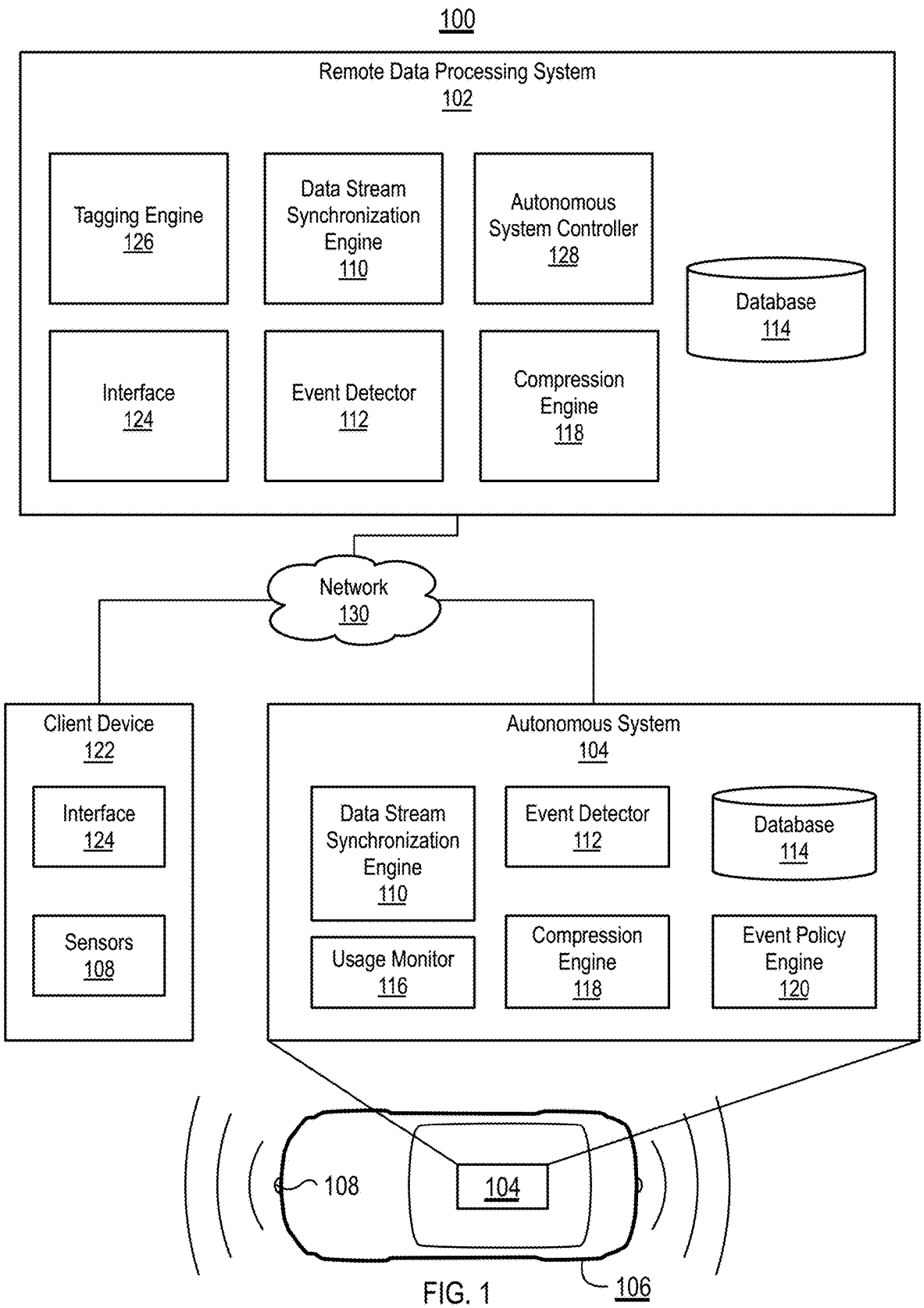
FIG. 1 illustrates a block diagram of an example system to identify events in the data streams of autonomous systems to prioritize the transmission and review of the events between an autonomous system and a remote data processing system.

FIG. 1 illustrates a block diagram of an example system 100 to review and prioritize the transmission of data between an autonomous system 106 and a remote data processing system 102. The system 100 can include a remote data processing system 102 and a autonomous processing system 104 that can be a local component of an autonomous system 106. The system 100 can include one or more client devices 122. The client devices 122, autonomous processing system 104, and remote data processing system 102 can communicate via a network 130.

The autonomous system 106 can include a plurality of sensors 108 and a autonomous processing system 104. The autonomous processing system 104 can include a usage monitor 116. The autonomous processing system 104 can include a data stream synchronization engine 110. The autonomous processing system 104 can include an event detector 112. The autonomous processing system 104 can include a compression engine 118. The autonomous processing system 104 can include an event policy engine 120. The autonomous processing system 104 can store data or instructions received from the remote data processing system 102, client devices 122, or sensors 108 into the database 114.

The remote data processing system 102 can be a server located remote from the autonomous system 106. The remote data processing system 102 can include an interface 124. The remote data processing system 102 can include a tagging engine 126. The remote data processing system 102 can include an instance of the data stream synchronization engine 110. The remote data processing system 102 can include an instance of the event detector 112. The remote data processing system 102 can include an instance of the compression engine 118. The remote data processing system 102 can include an instance of the autonomous system controller 128. The remote data processing system 102 can include a database 114.

The system 100 can also include one or more client devices 122. Each of the client devices 122 can include one or more sensors 108. Each of the client devices 122 can include an interface 124.

The components of the system 100 can communicate with one another via the network 130. The network 130 can include computer networks such as the internet, local, wide, near field communication, metro or other area networks, as well as satellite networks or other computer networks such as voice or data mobile phone communications networks, and combinations thereof. The network 130 can include or constitute an ad hoc network. The ad hoc network can be formed between a subset of the components of the system 100. For example, the ad hoc network can be formed between the autonomous system 106 and one or more client devices 122. The network 130 can be point-to-point or mesh network and can enable indirect communication between the components of the system 100. For example, the autonomous system 106 may not directly connect with the remote data processing system 102 but may connect with a client device 122 which in turn connects with the remote data processing system 102 to enable data transfer between the autonomous system 106 and the remote data processing system 102. The network 130 can include a broadcast network, telecommunications network, asynchronous transfer mode network, synchronous optical network, or a synchronous digital hierarchy network, for example. The network 130 can include at least one wireless link. The network 130 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols. The system 100 can include one or more autonomous systems 106. The autonomous system 106 can be fully or semi-autonomous. The autonomous system 106 can be perceptive and measure environmental variables with one or more sensors 108. The autonomous system 106 can be autonomous by making decisions based on the measured environmental variables. The autonomous system 106 can include autonomous or semi-autonomous trucks, cars, drones, robots, or other systems.

The autonomous system 106 can include a plurality of sensors 108. The sensors 108 can measure environmental variables (e.g., variables outside the autonomous system 106 such as distance to an object) and internal variables (e.g., variables inside the autonomous system 106 such as internal temperature). The sensors 108 can include video or still cameras, infrared (IR) time-of-flight sensors, IR time-of-flight stereo cameras, other IR sensors, other stereoscopic cameras (including, for examples, those used on borescopes), forward looking infrared (FLIR) sensors or cameras, near-IR sensors or cameras, other thermography sensors. The sensors 108 can include gas detection sensors (e.g. lower explosive limit (LEL) sensors, oxygen sensors, benzene sensors, etc.), ultrasonic sensors, eddy current sensors, other non-destructive testing (NDT) sensors, environmental sensors (e.g. temperature sensors, humidity sensors, particulate matter sensors), single-point ranging sensors, LIDAR sensors, or multi-point ranging sensors. The sensors 108 can include voltage and current sensors, mechanical sensors (e.g., motor position, arm position, and movement sensors), communication sensors (e.g., signal strength sensors), or position sensors (e.g., GPS sensors).

In some implementations, sensor data can include log file data generated by the autonomous processing system 104. For example, the autonomous processing system 104 can generate log files of communications transmitted from and to the autonomous system 106 or of computations or processes performed by the autonomous processing system 104 (e.g., path planning determinations and object movement predictions). The log file data can include configuration data, which can include configuration data and meta data such as autonomous system 106 identification information; autonomous system 106 hardware configuration information (e.g., number and placement of cameras or motors); autonomous system 106 software configuration information (e.g., firmware version); and system events (e.g., process interruptions or system crashes).

The sensors 108 can generate data streams of the data recorded, detected, or generated by the sensors 108. The data streams can include a times series of data points. The sensors 108 can sample data at a predetermined, substantially constant sampling rate. In some implementations, the sensors 108 can sample data at a variable sample rate or at predetermined times. The sensors 108 can pass the data to the autonomous processing system 104, which can write the data points to a file that is saved to the database 114. The autonomous processing system 104 can associate a time stamp with all or a portion of the data points written to the file.

The autonomous system's sensors 108 can generate a relatively large amount of data per hour. For example, the sensors 108 can generate between about 4 and about 7 terabytes of data per hour. The sensors 108 can generate a volume of data that cannot be timely transmitted to the remote data processing system 102. For example, the data cannot be streamed to the remote data processing system 102 in real time or can only be transmitted to the remote data processing system 102 with significant delay.

The autonomous system 106 can include a local or onboard autonomous processing system 104. The autonomous processing system 104 can receive data and data streams from the sensors 108. The autonomous processing system 104 can communicate directly or indirectly with the remote data processing system 102 and the client device 122 via the network 130. The autonomous processing system 104 can include one or more processors, software, embedded software, communication links for transmitting and receiving data via the network 130. The autonomous processing system 104 can include digital components or circuitry, including, for example, one or more component illustrated in FIG. 5.

The autonomous processing system 104 can include a usage monitor 116. The usage monitor 116 can be any script, file, program, application, set of instructions, or computer-executable code, that is configured to enable a computing device on which the usage monitor 116 is executed to determine one or more usage parameters of the autonomous processing system 104. The usage monitor 116 can determine usage parameters of the data processing system's processors, memory, or other hardware components or components of the autonomous system 106. The usage monitor 116 can determine usage parameters of the data processing system's software parameters. The usage monitor 116 can determine usage parameters of the autonomous system 106.

The usage parameters of the autonomous processing system 104 and the autonomous system 106 can indicate the current status of the autonomous processing system 104 and the autonomous system 106. The usage parameters can indicate the processor load or processor utilization of the data processing system's processors. The usage parameters can indicate the data processing system's current amount of available memory. The usage parameters can indicate tasks currently performed by the autonomous system 106 or autonomous processing system 104, such as navigating, moving, or lifting. The usage parameters can indicate current, planned, or predicted usage parameters. For example, the usage monitor 116 can interface with a scheduler to determine that a computational job will be performed at a predetermined time in the future or responsive to a predicted event. The usage parameters can indicate hardware utilization such as current power levels or network connectivity strength.

The usage monitor 116 can monitor the usage parameters and determine when the autonomous processing system 104 can perform computationally or bandwidth intensive actions, such as identifying events in the data streams and transmitting portions of the data streams to the remote data processing system 102. In some implementations, the usage monitor 116 can determine when the usage parameters falls below a predetermined threshold. For example, when the CPU load of the data processing system's processors falls below a predetermined threshold, the usage monitor 116 can trigger one or more computationally or bandwidth intensive actions. In some implementations, the usage monitor 116, based on the usage parameters, can determine that the autonomous system 106 can enter an idle state. The idle state can be a physically idle state rather than a computationally idle state. During the idle state, the usage monitor 116 can trigger the computationally intensive or bandwidth intensive actions. The actions can be the identification of events in the data streams, the extraction of segments from the data streams including the events, processing of the extracted segments, transmission of the data streams, or any combination thereof. Data streams that include the event can cover a time span that includes at least the time span of the event or at least a portion of the event.

The autonomous processing system 104 can include an event detector 112. The event detector 112 can be any script, file, program, application, set of instructions, or computer-executable code, that is configured to enable a computing device on which the event detector 112 is executed to identify events in the data streams. In some implementations, the event detector 112 only processes the data streams to identify events when the usage monitor 116 determines a usage parameter crosses a predetermined threshold. For example, the event detector 112 can begin to process the data streams to identify events when the usage parameter falls below the predetermined threshold, which can indicate that the autonomous processing system 104 can have available computational power for identifying events in the data streams.

The event detector 112 can identify events in the data streams based on value thresholds. For example, the data streams can include a time series of values, such as speed values, accelerate values, pressure values, battery voltage values. The event detector 112 can identify events based on when one or more of the values in the data streams crosses a detection threshold. For example, when the pressure values in a data stream from a pressure sensor measuring a tube fall below a threshold, the event detector 112 can identify the pressure drop as an event. The event in this example may indicate a clog in the tube.

The event detector 112 can identify events in the data streams based on statistical triggers. The statistical triggers can be thresholds based on statistics of a given data stream. For example, the statistical trigger can be a threshold crossing where the threshold is based on a standard deviation of the data stream's mean over the given, prior time window.

The event detector 112 can identify events in the data streams based on a state change. For example, the autonomous system 106 can operate under predefined states, such as an autonomous state or a manual state. In some implementations, the autonomous system 106 can set an internal state machine based on the values received from the sensors 108. The event detector 112 can identify the transition between states as an event.

The event detector 112 can identify events based on the activation of sensors 108. For example, the autonomous system 106 can include crash or impact sensors 108. The event detector 112 can register the activation (e.g., the reading of a non-zero value) of these sensors 108 as an event. In some implementations, the event detector 112 can identify an event based on an uncertainty in a calculation made by the autonomous processing system 104. For example, if the autonomous system's computer vision is not able to identify an object or the autonomous system's path planner cannot determine an appropriate path, the event detector 112 can register the uncertainty as an event.

The event detector 112 can identify events based on log file events or entries. For example, the event detector 112 can parse through log files to identify warning, error messages, or other messages logged into the log files. The event detector 112 can identify events based on communication events experienced by the autonomous system 106. The communication events can include the transmission or receipt of a notification or message. The communication events can include the establishment of a connection to the network 130 of a disconnect from the network 130. In some implementations, the event detector 112 can identify an event based on a message received from an external device such as the remote data processing system 102 or the client device 122. For example, the client device 122 can be the client device of an observer of the autonomous system 106 during a testing phase. The observer, via the client device 122, can transmit a message to the event detector 112 instructing the event detector 112 to mark the occurrence of an event when the observer notices, for example, an unexpected behavior of the autonomous system 106.

The client device 122 can identify events based on internal messaging of the autonomous system 106 or autonomous processing system 104. For example, the different components of the autonomous processing system 104 can transmit messages to transmit data between the different components. The event detector 112 can detect the message or data transfer between the different components and identify events based one predetermined data transfers. For example, the autonomous system 106 can have an object avoidance system. The event detector 112 can monitor the object avoidance system for data input or activation. The event detector 112 can identify an event based on the object avoidance system being activated.

The event detector 112 can identify events based on software activities. The event detector 112 can identify events based on the crash of an application or script executed by the autonomous processing system 104. The event detector 112 can identify an event based on a kernal panic. The event detector 112 can identify an event based on the autonomous processing system 104 receiving a software update, firmware update, or new configuration.

The event detector 112 can identify events based on object identification in the external environment. For example, the autonomous system 106 can include sensors 108 such as cameras that view the external environment. The autonomous processing system 104 can process the data streams from the cameras with machine vision algorithms to identify objects within the external environment. The event detector 112 can flag the identification of predetermined objects in the external environment as an event. For example, the event detector 112 can flag each time the machine vision system identified a stop sign. In some implementations, the data streams can have an overlapping sampling area. For example, the autonomous system 106 can include two front facing cameras. The autonomous system's machine vision system can process the data streams from the front facing cameras independently. The event detector 112 can flag as events instances where the same object is identified differently in the data streams with overlapping sampling areas. For example, the event detector 112 can flag the instance where the machine vision system identifies, in a first data stream, a speed limit sign displaying 65 mph but identifies, in a second data stream, the same speed limit sign as displaying 55 mph.

The event detector 112 can identify events based on machine learning. For example, the event detector's machine learning algorithm can be trained on events identified in data streams by human operators. When deployed the event detector 112 can identify events when the event detector 112 detects similar data streams. In some implementations, the machine learning algorithm can be trained to detect departures from the normal operation of the autonomous system 106.

The event detector 112 can identify events at predetermined intervals. For example, the event detector 112 can identify the data streams as including an event every 30 minutes. The periodically captured events can be used by the autonomous processing system 104 or the remote data processing system 102 as a baseline of normal operation.

Responsive to the event detector 112 detecting or identifying an event, the event detector 112 can extract a portion of the data stream that includes the event. This process is further described in relation to FIG. 4. In some implementations, the event detector 112 can identify the state time and end time of the event. The event detector 112 can extract a predetermined amount of data from the data stream before the state time and after the end time. The amount of data the event detector 112 extracts before the start of the event and the amount of data the event detector 112 extracts after the end of the event can be based on an event policy.

The autonomous processing system 104 can include an event policy engine 120. The event policy engine 120 can be any script, file, program, application, set of instructions, or computer-executable code, that is configured to enable a computing device on which the event policy engine 120 is executed to identify data stream extraction parameters. The event policy engine 120 can store one or more event policies in the database 114. Based on the events identified by the event detector 112, the event policy engine 120 can retrieve an event policy to instruct the event detector 112 how much data before and after the event, the event detector 112 should extract.

The event policy engine 120 can store different event policies for different event types. For example, the event policy engine 120 can generate or store a different event policy for each of a crash event, an uncertainty event, and a low power event.

An event policy can be a data structure that indicates, for a given event type, the amount of data prior to an event to extract, the amount of data after the event to extract, or processing to be performed on the extracted data. The processing to be performed on the extracted data can include up sampling the extracted portion, down sampling the extracted portion, filtering the extracted portion, compressing the extracted portion, dividing the extracted portion into multiple files, combining multiple extracted portions into a single combined portion, or any combination thereof.

In some implementations, the indication of the amount of data prior to and after the event to extract can be time based or size based. For example, a time based value can indicate to the event detector 112 to extract 30 seconds from the data stream prior to the start of the event. A size based value can indicate to the event detector 112 to extract 1 Gb of data from the data stream prior to the start of the event.

The autonomous processing system 104 can include a data stream synchronization engine 110. The data stream synchronization engine 110 can be any script, file, program, application, set of instructions, or computer-executable code, that is configured to enable a computing device on which the data stream synchronization engine 110 is executed to synchronize data streams. The data stream synchronization engine 110 can synchronize full data streams or portions thereof, such as the extracted portions that include events identified by the event detector 112.

The sensors 108 can capture (or the autonomous processing system 104 can sample the sensors 108) at different rates. For example, a first camera can sample at 24 frames per second, a pressure sensor can take pressure readings at 1 Hz, and a distance sensor can take distance readings at 500 Hz. The data stream synchronization engine 110 can synchronize or align each of the different data streams to a master clock or time series. Aligning the data streams to a master clock enables the identification of the values in each of the data streams at an identified time.

The data stream synchronization engine 110 can align the data streams with the master clock based on time stamps included in the data streams. The sensors 108 can append a time stamp to each sample in the data stream and the data stream synchronization engine 110 can match the times stamps of the data streams to the master clock. The sensors 108 can append or include time stamps at predetermined intervals, such as on key frames within a data stream including a video stream. The data stream synchronization engine 110 cam match the time stamps of the data stream to the master clock and can interpolate or estimate the position of the data points between the neighboring time stamps.

The data stream synchronization engine 110 can align the data streams with the master clock based on the sampling frequency of the sensors 108. For example, the data stream synchronization engine 110 can determines when the data stream started and then calculate each data sample's position on the master clock by multiplying the sampling frequency since the time since the start of the data stream.

The data stream synchronization engine 110 can up sample, down sample, interpolate, extrapolate, or perform other processes on one or more of the data streams to align each of the data streams with the master clock.

The data stream synchronization engine 110 can align the data streams with the master clock prior to extraction of a portion of the data streams that includes the event identified by the event detector 112. The data stream synchronization engine 110 can align the data streams with the master clock after extraction of a portion of the data stream that includes the event identified by the event detector 112. For example, a first portion of the data streams can first be extracted from each of the data streams. The first portion can be a portion larger than the final time or data size identified by the event policy engine 120. The data stream synchronization engine 110 can then align the first portions to the master clock and the aligned first portions can be trimmed to the time or data size identified by the event policy engine 120.

The data stream synchronization engine 110 can align log entries with the data streams. Events or data can be saved as log entries. Data from data streams that include infrequent updates or that have a relatively low degree of change over time can be saved to a log as an entry. For example, rather than saving the state of an autonomous vehicle's front headlights at a given sampling rate (e.g., 10 Hz), the autonomous processing system 104 can save state transitions to a log file. In this example, the autonomous processing system 104 can save the time at which the lights are turn on or off to the log file. The data stream synchronization engine 110 can process the log files to determine the state of data streams tracked in the log file (e.g., the state of the head lights). The data stream synchronization engine 110 can indicate the state of the data streams tracked in the log file with the aligned data streams. When only a portion of data streams are extracted and aligned, the data stream synchronization engine 110 can identify the state of the data streams tracked in the log file and include the state information with the aligned data streams. The data stream synchronization engine 110 can process the log file to identify the last state change even if the state change occurred before the extracted portion of the data streams.

The autonomous processing system 104 can include a compression engine 118. The compression engine 118 can be any script, file, program, application, set of instructions, or computer-executable code, that is configured to enable a computing device on which the compression engine 118 is executed to compress the data streams. The compression engine 118 can compress the data streams prior to transmission over the network 130. The compression engine 118 can compress the data streams for storage in the database 114. The compression engine 118 is further described in relation to Section B.

The compression engine 118 can include a plurality of different compression algorithms. For example, the compression engine 118 can include different compression algorithms for different types of data, such as, video data, text data, and time series data. The compression engine 118 can include one or more compression temporal and spectral based compression algorithms for the compression of video or image containing data streams. The compression engine 118 can include lossless or lossy compression algorithms for the compression of data streams.

The compression engine 118 can reduce the files size of the data streams by down sampling the data streams. In some implementations, the compression engine 118 can down sample only portions of the data streams. For example, the compression engine 118 can down sample portions of the data streams that are flagged as containing events and the compression engine 118 can leave the portions of the data streams containing the events at their full resolution.

The compression engine 118 can reduce the file size of the data streams by combining a plurality of data streams into a single data stream. The compression engine 118 can include a visualization module that receives a plurality of data streams and combines the data streams into a new data stream or data file, such as a visualization with a file size smaller than sum of each of the input data streams' file size. For example, the compression engine 118 can generate a 3D model of the autonomous system's external environment based on data streams that can include the autonomous system's internal map the point cloud from one or more LIDAR sensors, and video or image data from one or more cameras. In some implementations, the compression engine 118 can compress or down sample the generated visualization.

The visualization module of the compression engine 118 can generate compositions from one or more data streams. An example of a composition that can include a single data stream can be an image generated from the point cloud of a LIDAR sensor. An example of a composition that can include a plurality of data streams can be a composition that can include data from a LIDAR point cloud, an internal map, object bounding boxes (e.g., bounding boxes where the autonomous system believes objects exist), and a planned path. The compression engine 118 can combine the data streams into a single composition that can be a visualization, such as a video. The video of the composition can have a lower file size that the sum of the individual data streams used to generate the composition.

The compression engine 118 can also generate compositions that can include motion prediction cues, navigable terrain, obstacle information, and spatial boundaries. The motion prediction cues can include, for an object identified within an image, an overlay vector indicating a predicted or projected path of the object. The navigable terrain composition can include a map or image layered with data indicates where the autonomous system believes it can travel. The obstacle information composition can be an inverse of the navigable terrain composition and can indicate areas where the autonomous system cannot travel. The spatial boundaries composition can indicate a boundary within which the autonomous system should not let objects (e.g., people or obstacles) under predetermined conditions (e.g., when moving).

The autonomous processing system 104 can include a database 114. The database 114 can be a local storage system. The database 114 can include or be a component of a hard disk, solid state disk, flash memory card, RAM, or ROM. The database 114 can be removable from the autonomous system 106. The autonomous processing system 104 can store raw data streams to the database 114. The autonomous processing system 104 can store down sampled data streams to the database 114. The autonomous processing system 104 can store event policies on the database 114. The system 100 can include a remote data processing system 102. The remote data processing system 102 can include at least one logic device such as a computing device having a processor to communicate via the network 130, for example, with autonomous system 106 and client device 122. The remote data processing system 102 can include at least one computation resource, server, processor, or memory. For example, the remote data processing system 102 can include a plurality of computation resources or servers located in at least one data center. The event policy engine 120 can be executed by one or more servers. The one or more servers can include multiple, logically-grouped servers and facilitate distributed computing techniques. The one or more servers can be hosted in a data center, server farm, or a machine farm. The servers can also be geographically dispersed. The one or more servers can be stored in high-density rack systems, along with associated storage systems, and located in an enterprise data center. For example, consolidating the servers in this way may improve system manageability, data security, the physical security of the system, and system performance by locating servers and high-performance storage systems on localized high performance networks.

The remote data processing system 102 can include an instance of the event detector 112, the compression engine 118, and the data stream synchronization engine 110. The instances of the event detector 112, the compression engine 118, and the data stream synchronization engine 110 can perform the functions described in relation to the event detector 112, the compression engine 118, and the data stream synchronization engine 110 of the autonomous processing system 104. In some implementations, the autonomous processing system 104 can include one or more of the components described in relation to the remote data processing system 102, such as the tagging engine 126 or autonomous system controller 128.

In some implementations, the remote data processing system 102 can have greater computational power when compared to the autonomous processing system 104 and can perform additional functions or actions on the data streams received from the autonomous system 106. For example, remote data processing system's event detector 112 may identify a set of events and the autonomous system's event detector 112 may identify only a portion of the set of events. In some implementations, the autonomous processing system 104 can analyze low fidelity versions of the data streams (e.g., down sampled, compresses, combined, or selected portions) and the remote data processing system 102 can analyze high fidelity versions of the data streams (e.g., uncompressed or raw versions of the data streams).

The remote data processing system 102 can include a database 114. The database 114 can be a storage element similar to the database 114 of the autonomous processing system 104, main memory 515, or storage device 525 described in relation to FIG. 5. The remote data processing system 102 can include a tagging engine 126. The tagging engine 126 can be any script, file, program, application, set of instructions, or computer-executable code, that is configured to enable a computing device on which the tagging engine 126 is executed to apply tags to the data streams. The tagging engine 126 can apply tags to data streams or portions thereof based on the context of the autonomous system 106 during the recording of the data streams, based on events identified by the event detector 112, based on values of the data streams, or based on manual input from a user. The tags can indicate times, events, objects within the data streams, environmental conditions, seasons, data stream type, sensor type, nor actions performed by the autonomous system 106. The qualifications or requirements for placing a tag on a data stream can be user generated or user specified.

The tagging engine 126 can apply the tags to the meta data of the data streams or otherwise associate the tags with the data streams. The remote data processing system 102 can use the tags to sort, group, and classify the data streams and portions thereof. For example, a user can submit a request to the remote data processing system 102 for data streams with each of the tags {night, video, rain} to retrieve or view data streams that include video and were captured at night while it was raining.

The remote data processing system 102 can include an interface 124. The interface 124 can be any script, file, program, application, set of instructions, or computer-executable code, that is configured to enable a computing device on which the interface 124 is executed to enable data exchange with the remote data processing system 102. The interface 124 can be a hardware interface (e.g., a network connection). The interface 124 can be a software interface. For example, the remote data processing system 102 can perform web server functionality and the interface 124 can generate and provide a web interface (e.g., one or more web pages) that can be access by a web browser executed on the client device 122. An example web (or application) interface is further described in relation to Section C. In some implementations, the client device 122 can interact with the interface 124 and remote data processing system 102 through an application other than a web browser. For example, a companion application of the remote data processing system 102 can be installed on the client device 122. The interface 124 can expose an API to the application that enables the application to make GET and POST calls, for example, to the remote data processing system 102.

The web interface generated by the interface 124 can enable user to view data streams, visualizations of the data streams, autonomous system 106 configurations, and other information about the remote data processing system 102 and autonomous system 106.

In some implementations, the web interface can include an inbox view, a review view, and an introspection view. The inbox view can present the user with newly identified events or newly tagged data streams or portions thereof. The inbox view can display meta data about the data streams or autonomous system 106 that generated the data streams, location information of the autonomous system 106, and indications of the tags applied to the data streams. The review view can be used to display the data streams and visualizations thereof. The introspection view can be an extension to the review view. The review view can show a limited amount of meta or other data and the introspection view can include the full meta or other data that is associated with the data streams.

When displaying data streams to the user, the interface 124 can interface with the data stream synchronization engine 110 to time sync the data streams so that the data streams displayed at a given time to the user were captured at the same time. The interface 124 can embed links in the web interface to the data streams or portions thereof. The links can enable the client device 122 to download the data streams or portions thereof from the remote data processing system's database 114 to a memory element of the client device 122.

The interface 124 can include in the web interface status information. The status information can include information about the processing of data streams or the state of the data streams (e.g., rendering, uploading, complete, or time for the current stage to complete). The interface 124 can enable a user to prioritize a specific event or computational request over other computational requests. For example, the interface 124 can enable a user, via the client device 122, to request that a given data stream be processed before another data stream.

The remote data processing system 102 can include an autonomous system controller 128. The autonomous system controller 128 can be any script, file, program, application, set of instructions, or computer-executable code, that is configured to enable a computing device on which the autonomous system controller 128 is executed to manage autonomous systems 106. The autonomous system controller 128 is described further in relation to FIG. 2.

The autonomous system controller 128 can perform metrics on the autonomous systems 106 and data streams. The autonomous system controller 128 can perform deployment testing. The autonomous system controller 128 can generate training data sets based on stored data streams and can train machine learning algorithms used by the remote data processing system 102 and autonomous system 106. The system 100 can include a client device 122. The client device 122 can be in communication with the remote data processing system 102 and the autonomous processing system 104 via the network 130. The client device 122 can include one or more processors and can be a laptop computer, smart phone, desktop computer, tablet, or other computing device.

The client device 122 can include an interface 124. The interface 124 can be any script, file, program, application, set of instructions, or computer-executable code, that is configured to enable a computing device on which the interface 124 is executed to provide a user interface to the user of the client device 122 and exchange data with the remote data processing system 102 and autonomous processing system 104. In some implementations, the interface 124 can be or be a component of a web browser. For example, the remote data processing system 102 can provide a web interface that the client device 122 can access and render to the user via a web browser.

The client device 122 can include one or more sensors 108. The client device 122 can generate data streams with the sensors 108. The client device 122 can apply time stamps to the data streams such that the data streams generated by the client device 122 can be synced to the same master clock as the data streams generated by the autonomous system 106. For example, the sensor 108 can include a camera used to capture video data of the autonomous system 106 as the autonomous system 106 performs actions. The data stream from the client device 122 can provide an external view of the actions performed by the autonomous system 106. The remote data processing system 102 or the autonomous processing system 104 can synchronize the client device's data stream with the data streams of the autonomous processing system 104.

Figure 2:
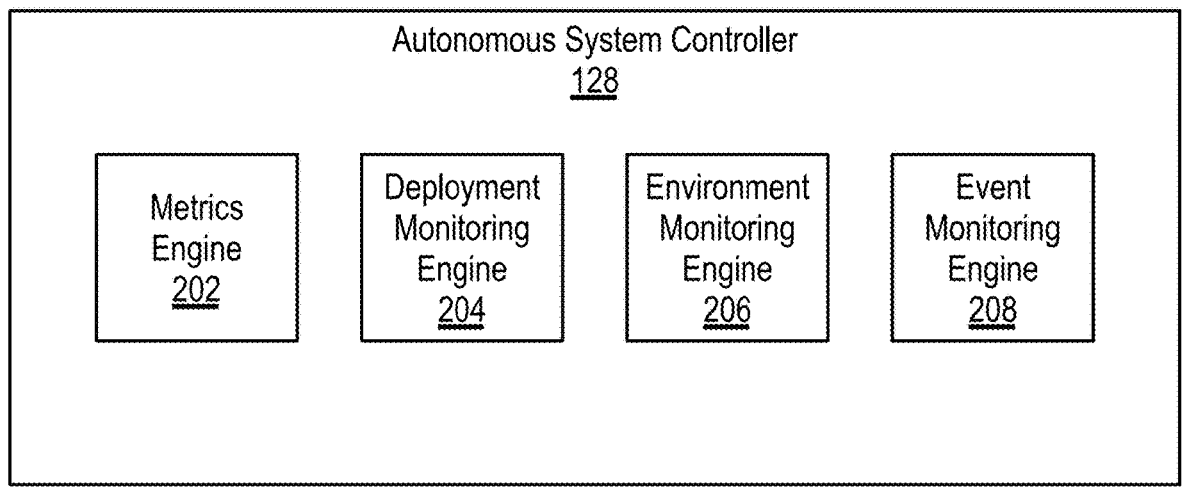
FIG. 2 illustrates a block diagram of the components of the autonomous system controller for use in the system illustrated in FIG. 1.

FIG. 2 illustrates a block diagram 200 of the components of the autonomous system controller 128. The autonomous system controller 128 can include a metrics engine 202. The autonomous system controller 128 can include a deployment monitoring engine 204. The autonomous system controller 128 can include an environment monitoring engine 206.

The autonomous system controller 128 can include a metrics engine 202. The metrics engine 202 can be any script, file, program, application, set of instructions, or computer-executable code, that is configured to enable a computing device on which the metrics engine 202 is executed to calculate performance metrics based on the data streams. The metrics engine 202 can calculate performance metrics of events that occurred on a given run, outing, or time frame of the autonomous system 106. For a given run, the remote data processing system 102 can receive a plurality of data streams form the autonomous system 106 and client devices 122. The tagging engine 126 or a user of the client device 122 can apply tags to the data streams to mark the occurrences of specific events. The metrics engine 202 can calculate performance metrics for the run and events. The performance metrics can include an indication of a number of times a specific event occurred, how may events or errors were attributed to a specific system within the autonomous system 106, and the quality of the outcomes relative to the autonomous system's goals (e.g., was the delivery successfully made or did the autonomous system 106 reach its target location successfully). The metrics engine 202 can aggregate the performance metrics from individual runs over plurality of runs, over a plurality of autonomous systems 106, over a plurality of system types, over a plurality of autonomous system 106 configurations, for example.

The metrics engine 202 can include a deployment monitoring engine 204. The deployment monitoring engine 204 can be any script, file, program, application, set of instructions, or computer-executable code, that is configured to enable a computing device on which the deployment monitoring engine 204 is executed to monitor updates or changes to the autonomous system 106. Over time changes can be made to the autonomous system 106. The changes can include the addition, replacement, or removal of one or more hardware components of the autonomous system 106 such as sensors 108 or components of the autonomous processing system 104. The changes can include upgrades to the software or firmware of the autonomous processing system 104 or autonomous system 106. The deployment monitoring engine 204 can analyze the performance metrics of the autonomous systems 106 with the changes to the autonomous systems without the changes to determine whether the effect of changes on the autonomous systems 106. For example, the deployment monitoring engine 204 may monitor the before and after performance metrics to determine if error rates increased or decreased after the change to the autonomous system 106. The changes may only be deployed to a subset of the autonomous systems 106 in the system 100 until the deployment monitoring engine 204 determines the changes are safe, increase performance of the autonomous system 106, or do not negatively impact the performance of the autonomous system 106.

The metrics engine 202 can include an environment monitoring engine 206. The environment monitoring engine 206 can be any script, file, program, application, set of instructions, or computer-executable code, that is configured to enable a computing device on which the environment monitoring engine 206 is executed to collect portions of data streams with predetermined environmental conditions. Environmental conditions, such as a setting sun, rain, and poor illumination, and affect vision and other systems of the autonomous system 106. In some implementations, the metrics engine 202 can calculate performance metrics for predetermined environmental conditions. The metrics engine 202 can provide the environment monitoring engine 206 with one or more environmental conditions under which the metrics engine 202 would like to calculate performance metrics and the environment monitoring engine 206 can select portions of the data streams with the environmental conditions. In some implementations, the environment monitoring engine 206 can select portions of the data streams with predetermined environmental conditions and provide the portions of the data streams to a machine learning algorithm of the remote data processing system 102 to train the machine learning algorithm under the predetermined environmental conditions.

Figure 3:
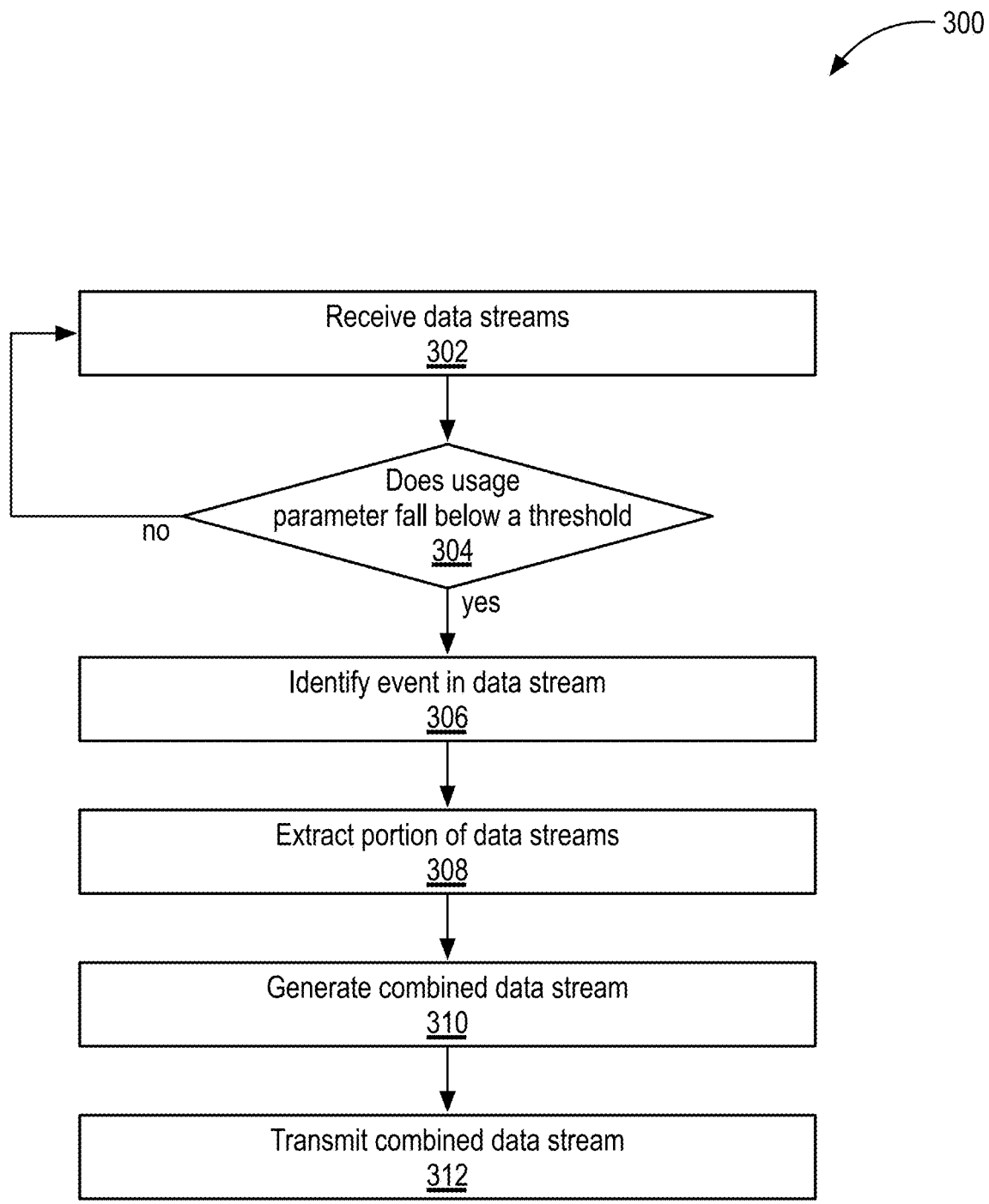
FIG. 3 illustrates a block diagram of an example method for transmitting data with the system illustrated in FIG. 1.

FIG. 3 illustrates a block diagram of an example method 300. The method 300 can include receiving data streams (BLOCK 302). The method 300 can include determining whether usage parameters fall below a threshold (BLOCK 304). The method 300 can include identifying events in the data streams (BLOCK 306). The method 300 can include extracting portions of the data streams (BLOCK 308). The method 300 can include generating a combined data stream (BLOCK 310). The method 300 can include transmitting the combined data stream (BLOCK 312).

As set forth above, the method 300 can include receiving a plurality of data streams (BLOCK 302). Also referring to FIG. 1, among others, the autonomous processing system 104 can receive a plurality of data streams. The autonomous processing system 104 can receive the data streams from one or more sensors 108 of the autonomous system 106. The autonomous system 106 can generate the data streams while the autonomous system 106 performs a task, action, or run. For example, if the autonomous system 106 is an autonomous car, the autonomous system 106 can generate data streams that include video data of the external environment as the autonomous system 106 travels from point A to point B, speed data, location data, LIDAR data, and other data generated by the autonomous system 106.

The method 300 can include determining whether usage parameters fall below a threshold (BLOCK 304). The usage parameters can be usage parameters of the autonomous system 106 or autonomous processing system 104. The usage parameters of the autonomous processing system 104 and the autonomous system 106 can indicate the current status of the autonomous processing system 104 and the autonomous system 106. The usage parameters can indicate the processor load or processor utilization of the data processing system's processors. The usage parameters can indicate the data processing system's current amount of available memory. The usage parameters can indicate tasks currently performed by the autonomous system 106 or autonomous processing system 104, such as navigating, moving, or lifting. The usage parameters can indicate current, planned, or predicted usage parameters. For example, the usage monitor 116 can interface with a scheduler to determine that a computational job will be performed at a predetermined time in the future or responsive to a predicted event. The usage parameters can indicate hardware utilization such as current power levels or network connectivity strength.

The usage monitor 116 can determine when the autonomous system 106 can perform computationally or bandwidth intensive actions, such as identifying events in the data streams and transmitting portions of the data streams to the remote data processing system 102, when the usage parameters fall below the predetermined threshold. For example, when the CPU load of the data processing system's processors falls below a predetermined threshold, the usage monitor 116 can trigger one or more computationally or bandwidth intensive actions. In some implementations, the usage monitor 116, based on the usage parameters, can determine that the autonomous system 106 can enter an idle state. The idle state can be a physically idle state rather than a computationally idle state. During the idle state, the usage monitor 116 can trigger the computationally intensive or bandwidth intensive actions. The actions can be the identification of events in the data streams, the extraction of segments from the data streams including the events, processing of the extracted segments, transmission of the data streams, or any combination thereof.

If the usage monitor 116 determines the usage parameters are not below the threshold, the method 300 can continue to receive data streams. If the usage monitor 116 determines the usage parameters are below the predetermined threshold, the method 300 can proceed to identify events in the data stream (BLOCK 306). In some implementations, the autonomous system 106 can continue to receive data stream as the autonomous processing system 104 performs the steps of BLOCK 306-312.

The method 300 can include identifying events in the data streams (BLOCK 306). In some implementations, the data stream synchronization engine 110 can sync one or more data streams to a master clock to temporally align the data streams. The event detector 112 can identify the events in the one or more of the temporally aligned data streams. The events can be errors, the identification of objects in the autonomous system's field of view, or the occurrence of environmental conditions or other conditions. The events can be one or more of the events that the event detector 112 can identify. The events can be actions taken by the autonomous system, such as making a left-hand turn. The events can be instances where the values in one or more data streams crosses a predetermined threshold indicating the occurrence of an event. In some implementations, the event policy engine 120 can indicate some events as having a higher priority, such as errors. In some implementations, high priority events can be identified a BLOCK 306 and transmitted to the remote data processing system 102. Lower priority events can be identified but may not be initially transmitted to the remote data processing system 102. For example, the high priority events may be transmitted wirelessly to the remote data processing system 102 while the autonomous system 106 is in the field and the lower priority events may be retained in the data processing system's database 114 and downloaded once the autonomous system 106 returns to a base station.

The method 300 can include extracting portions of the data stream (BLOCK 308). The data stream synchronization engine 110 can synchronize the data streams to a master clock. The autonomous processing system 104 can extract portions of the data streams that include the identified events. In some implementations, the autonomous processing system 104 extracts only portions of the data streams that include high priority events. For each event type, the event policy engine 120 can include a policy that indicates the amount of data that should be extracted before and after the occurrence of the event.

Figure 4:
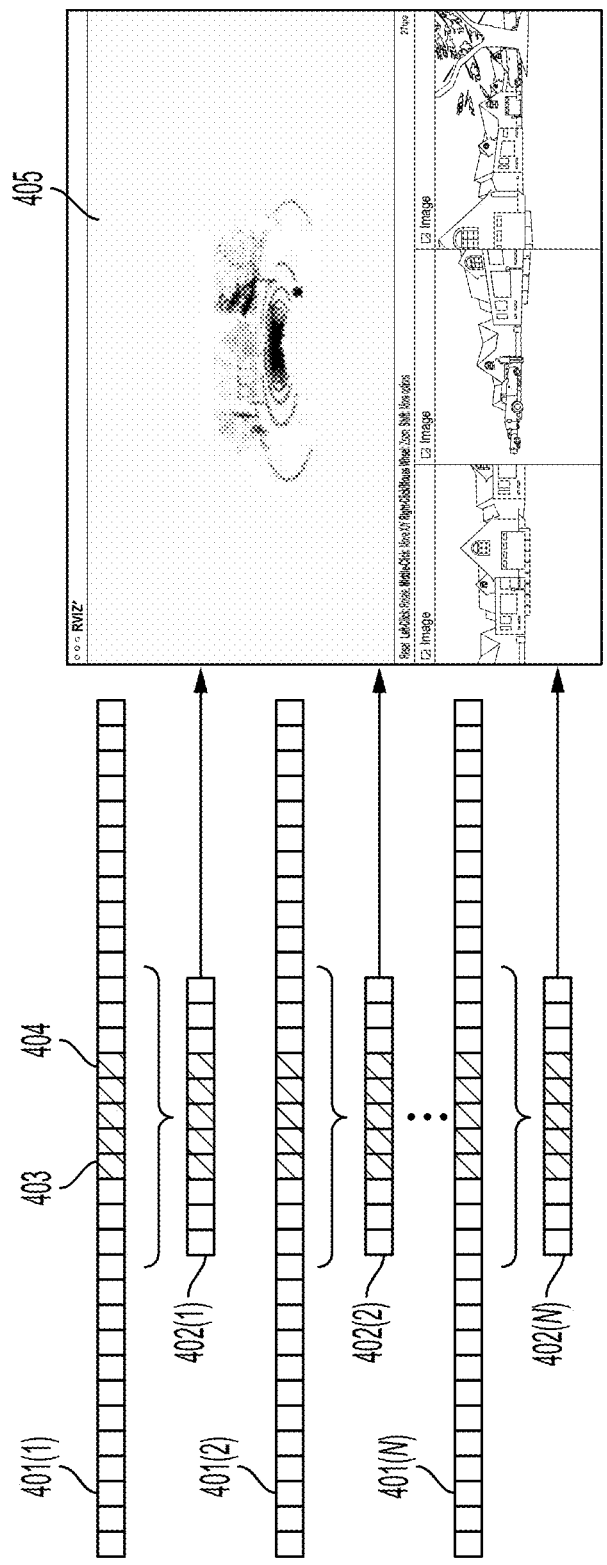
FIG. 4 illustrates a block diagram of an example method of extracting portions of data streams to generate a data visualization using the system illustrated in FIG. 1.

FIG. 4 illustrates a block diagram of extracting portions of data streams. At a given time, the autonomous processing system 104 can receive or generate data streams 401(1)-401(N), which are generally referred to as data streams 401. The event detector 112 can detect the start of an event 403 and the end of an event 404 in one or more of the data streams 401. For the data streams 401(1)-401(N), the autonomous processing system 104 can extract a respective portion 402(1)-402(N) (generally referred to as portions 402) that includes the event. The autonomous processing system 104 can extract a portion 402 for each of the data streams 401 or for only a portion thereof. For example, the autonomous system 106 can include six cameras and the autonomous processing system 104 may only extract a portion 402 for the forward facing cameras. The amount of data in the portions 402 before and after the event configured based on the event policy engine 120.

Referring to FIG. 3, the method 300 can include generating a combined data stream (BLOCK 310). The combined data stream can be a third data stream generated by the compression engine 118. In some implementations, the combined data stream can be a visualization generated by the combination of the extracted portions of the data streams. For example, and referring to FIG. 4, the data streams 401 can be LIDAR data streams generated by an autonomous system 106. The autonomous processing system 104 can extract portions 402 when the autonomous system 106 nears a house (the event), for example. The compression engine 118 can combine the portions 402 into a visualization 405. The visualization 405 can be a point cloud generated from the data of the portions 402. The visualization 405 can have a smaller file size when compared to the sum of individual file sizes of the portions 402.

The method 300 can include transmitting the combined data stream (BLOCK 312). The autonomous processing system 104 can transmit the combined data stream to the remote data processing system 102 via the network 130. The combined data stream can be viewed by the client device 122 via the interface 124. In some implementations, the autonomous processing system 104 can transmit the extract portions of the data streams to the remote data processing system 102. For example, the autonomous processing system 104 can transmit the data streams or portions thereof to the remote data processing system 102 once docketed at a docking station or when the autonomous processing system 104 has a higher bandwidth connection to the network 130. In some implementations, the autonomous processing system 104 can transmit the combined data stream to the remote data processing system 102 when the data processing system's connection to the network 130 is has a bandwidth below a predetermined threshold and one or more of the raw data streams to the remote data processing system 102 when the connection has a bandwidth above the predetermined threshold.

Figure 5:
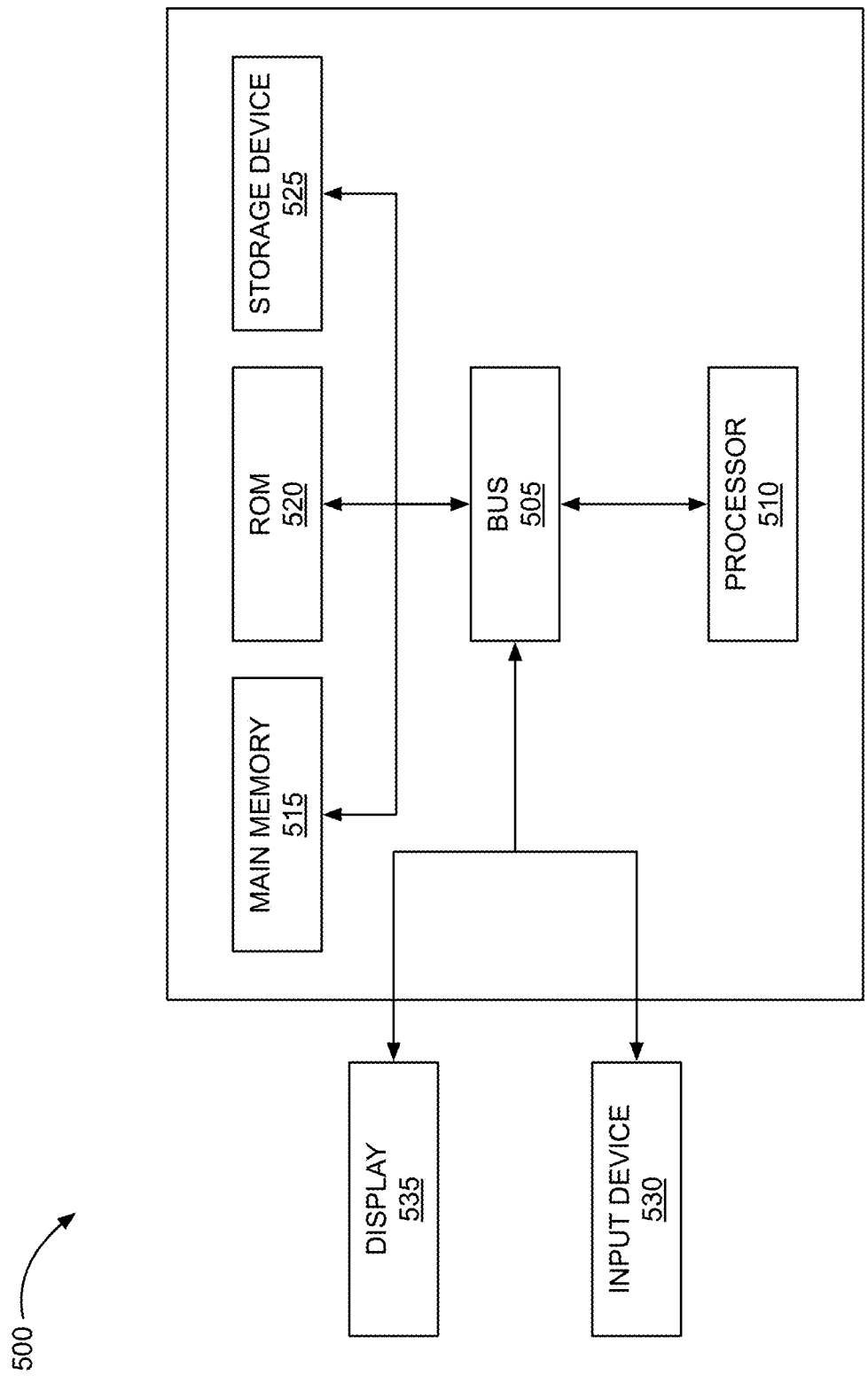
FIG. 5 illustrates a block diagram of an example computer system that can be used in the system illustrated in FIG. 1.

FIG. 5 illustrates a block diagram of an example computer system 500. The computer system or computing device 500 can include or be used to implement the system 100 or the components thereof. The computer system 500 can be a data processing system or a client device. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the database 114. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the database 114.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the remote data processing system 102, autonomous processing system 104, or client device 122, for example.

The processes, systems, and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "client device," "component," or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients (e.g., client device 122 or autonomous processing system 104) and servers (e.g., remote data processing system 102). A client and server are remote from each other and typically interact through a communication network (e.g., the network 130). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the remote data processing system 102 from the client device 122 or autonomous processing system 104).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the tagging engine 126 can be a single component, app, or program, or a logic device having one or more processing circuits, or part of one or more servers of the data processing system 102.

B. Systems and Methods for Compressing Data in Automated Robotic Systems

As described above, during operation, an autonomous system can generate large amounts of data. For example, an autonomous car can generate between about 4 Tb and about 7 Tb of data per hour of operation. The data can be stored as full-sized, raw data (e.g., uncompressed data). The autonomous system can also store or transmit the data as compressed data. The autonomous robotic system can include a compression engine that can compress the data for storage or transmission.

The autonomous robotic system can generate compressed data files that include high-resolution data but have reduced file sizes when compared to the uncompressed data files. The autonomous robotic system can generate smaller file sizes in a computationally efficient manner to reduce network bandwidth usage and storage requirements. The autonomous robotic system can identify temporal and spectral changes in temporal-based, input data (e.g., video data or other data that is recorded over time). Based on the temporal and spectral changes, the autonomous robotic system can compress the data input data into compressed data with the same resolution as the input data. The compression engine can be a component of the autonomous robotic system, a remote data processing system, or a client device.

Figure 6:
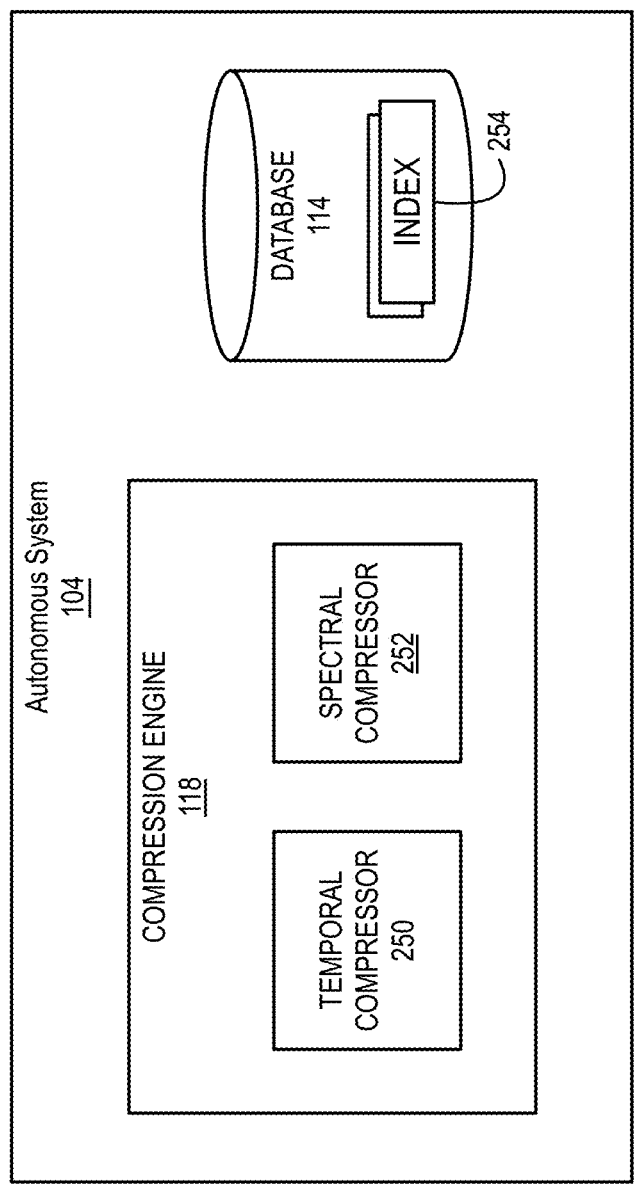
FIG. 6 illustrates a block diagram of the autonomous processing system.

FIG. 6 illustrates the example autonomous processing system 104 from FIG. 1 with additional details of the compression engine 118. The autonomous processing system 104 illustrated in FIG. 6 can include any components of and perform any functions of the autonomous processing system 104 described above in relation to FIG. 1 or elsewhere herein. The compression engine 118 can include a temporal compressor 250 and a spectral compressor 252. The database 114 can store one or more index files 254. The temporal compressor 250 and the spectral compressor 252 can also be components of the data processing system's compression engine 118.

As described above, the compression engine 118 can compress the data streams detected or recorded by the sensors 108 of the autonomous system 106. The compression engine 118 can include a temporal compressor 250 and a spectral compressor 252 for the compression of data streams that include video, a time series of images, or other data recorded over time.

The spectral compressor 252 can be any script, file, program, application, set of instructions, or computer-executable code, that is configured to enable a computing device on which the spectral compressor 252 is executed to compress data streams by removing redundancy within frames of an image-based data stream, such as a video. The spectral compressor 252 can remove redundancy or otherwise compress each frame of a video based on the content of the frame. The spectral compressor 252 can perform lossy or lossless compression on each of the frames. For example, the spectral compressor 252 can partition the pixels of a given frame into a plurality of blocks. The pixels from each of the plurality of blocks can be combined or otherwise transformed into a fewer number of pixels using wavelet or discrete cosine transformations, quantization, or entropy encoding. The spectral compressor 252 can compress each frame with compression algorithms, such as the JPEG image compression algorithm.

The temporal compressor 250 can be any script, file, program, application, set of instructions, or computer-executable code, that is configured to enable a computing device on which the temporal compressor 250 is executed to compress data streams by removing temporal redundancy between frames of an image-based data stream, such as a video. As described further in relation to FIGS. 7 and 8, the temporal compressor 250 can detect inter-frame differences (e.g., temporal differences between frames). The temporal compressor 250 can determine when the difference between frames is above a predetermined threshold indicating that the compared frames are not similar. The temporal compressor 250 can mark frames that have a high degree of difference between neighboring frames (e.g., the temporal difference is above the predetermined threshold) and add the frames to the compressed output file. The difference between frames can also be measured as the similarity between frames such that frames with a high degree of difference can have a low similarity metric. The temporal compressor 250 can also generate an index file 254 for each compressed file. The index file 254 can include a mapping between the frame in the compressed file and the frame in the original, uncompressed file. The index file 254 can enable the temporally compressed files to be synchronized to or played with other data streams.

Figure 7:
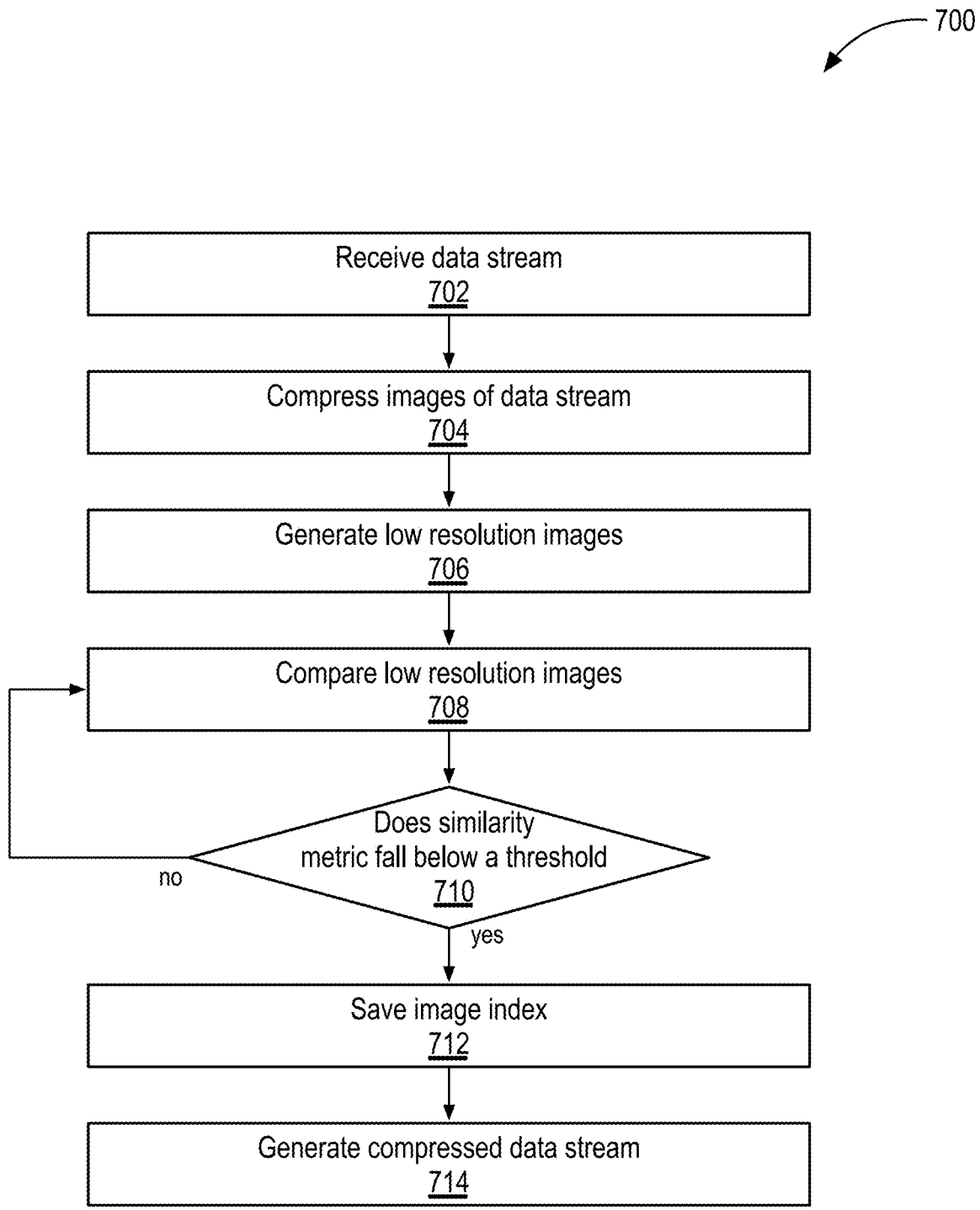
FIG. 7 illustrates a method to compress data by an autonomous system using the system illustrated in FIG. 1.

FIG. 7 illustrates a method 700 to compress data by an autonomous system, such as an autonomous vehicle. The method 700 can include receiving a data stream (BLOCK 702). The method 700 can include compressing images of the data stream (BLOCK 704). The method 700 can include generating low resolution images (BLOCK 706). The method 700 can include comparing low resolution images (BLOCK 708). The method 700 can include determining whether a similarity crosses a threshold (BLOCK 710). The method 700 can include saving an image index (BLOCK 712). The method 700 can include generating a compressed data stream (BLOCK 714).

As set forth above, the method 700 can include receiving a data stream (BLOCK 702). Also referring to FIG. 1, among others, the autonomous processing system 104 can receive a plurality of data streams. The autonomous processing system 104 can receive the data streams from one or more sensors 108 of the autonomous system 106. The autonomous system 106 can generate the data streams while the autonomous system 106 performs a task, action, or run. For example, if the autonomous system 106 is an autonomous car, the autonomous system 106 can generate data streams that include video data of the external environment as the autonomous system 106 travels from point A to point B. The autonomous processing system 104 can identify one or more of the received data streams that can be compressed with the temporal compressor 250 and spectral compressor 252.

Figure 8:
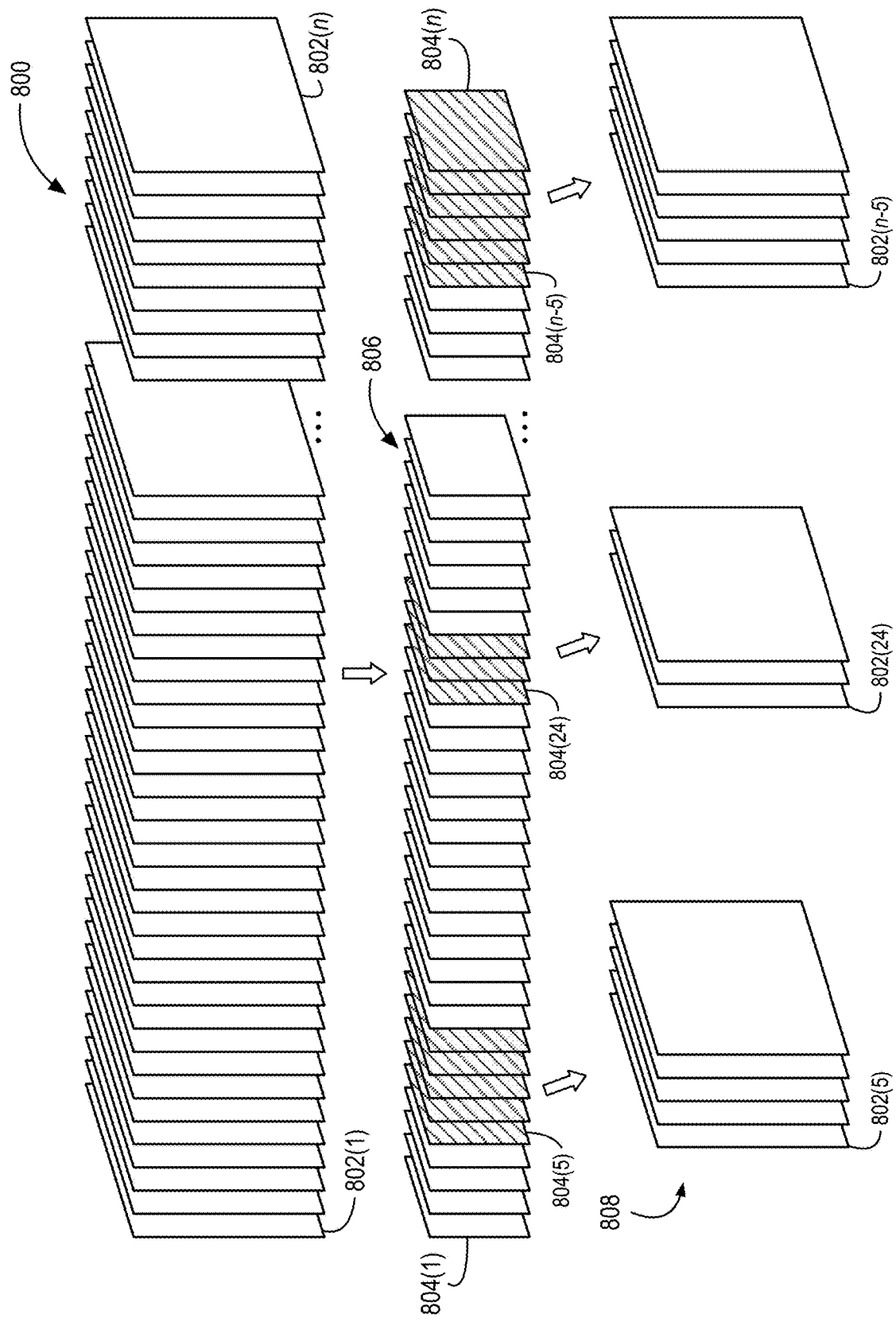
FIG. 8 illustrates a schematic representation of an example data stream at different steps of the method illustrated in FIG. 7.

FIG. 8 illustrates a schematic representation of an example data stream 800 at different steps of the method 700. The data stream 800 can be a data stream of a video and can include images 802(1)-802(n). The images 802(1)-802(n) can generally be referred to as images 802 or frames 802. A camera can capture the data stream 800 at a substantially constant frame rate (e.g., 24 frames/second). In this example, the data stream 800 would include 24 frames 802 for every second's worth of recorded data. Each frame 802 can be associated with a time that can indicate a relative time for the frame 802 (e.g., 5227.625 seconds into the file) or an absolute time (e.g., a unix timestamp of 1541712038). Each of the frames 802 can include an initial resolution that can be represented as a number of pixels in a horizontal direction and a number of pixels in a vertical direction. For example, each frame 802 can be 3840×2160 pixels (e.g., the data stream 800 can be a 4K video).

Also referring to FIG. 7, the method 700 can include compressing data stream (BLOCK 704). The data stream can be compressed multiple times during the steps of the method 700. At BLOCK 704, the intra-frame compression can be used to compress the images of the data stream. For example, each of the frames 802 can be compressed with video or image compression algorithms by the spectral compressor 252. The spectral compressor 252 can perform intra-frame compression. The intra-frame compression can reduce the file size that each of the frames 802 uses when stored. The intra-frame compression can reduce the pixel count of the frames 802. For example, the intra-frame compression can reduce an input frame 802 from an input size of 3840×2160 pixels to 1280×720 pixels. The spectral compressor 252 can use JPEG, PNG, of H.264 encoding to compress the data size of each of the frames 802.

The method 700 can include generating low resolution images (BLOCK 706). The spectral compressor 252 can generate the low-resolution images by down sampling the frames 802. For example, and referring to FIG. 8, the spectral compressor 252 can convert the data stream 800 into a second data stream 806 that includes a plurality of low-resolution frames 804(1)-804(n). The second data stream 806 can include the same number of low-resolution frames 804 as the data stream 800 includes frames 802. For example, in the example illustrated in FIG. 8, each of the data stream 800 and second data stream 806 include n frames. The low-resolution frames 804 can have a resolution of about 32×16, about 64×32, about 128×64, about 256×128, about 512×256, or about 1024×512 pixels. The frames 804 can be time locked with the frames 802.

The method 700 can include comparing the low resolution images (BLOCK 708). For example, the temporal compressor 250 can compare neighboring low-resolution frames 804 (e.g., low-resolution frame 804(n) can be compared to low-resolution frame 804(n+1)) to generate a similarity metric between the compared low-resolution frames 804. The temporal compressor 250 can compare low-resolution frames 804 that are not direct neighbors (e.g., low-resolution frame 804(n) can be compared to low-resolution frame 804(n+2)) to generate a similarity metric. The temporal compressor 250 can generate the similarity metric based on a comparison of a first plurality of low-resolution frames 804 with a second plurality of low-resolution frames 804. For example, the first plurality of low-resolution frames 804 can be average together and compared with the average of the second plurality of low-resolution frames 804.

The similarity metric can indicate how similar or different two compared low-resolution frames 804 are. The temporal compressor 250 can generate the similarity metric by performing a pixel-wise operation between the pixels of the two low-resolution frames 804. For example, the similarity metric can include a comparison of a pixel at location (x,y) in a first low-resolution frame 804 and a pixel at location (x,y) in a second low-resolution frame 804. The temporal compressor 250 can repeat the comparison for each pixel location of the compared low-resolution frames 804. The similarity metric can be a sum of the differences between the respective pixels in the compared low-resolution frames 804. The similarity metric can be a count of the number of pixels that have a change value above a predetermined threshold. The similarity metric can be based on all the data contained within each of the pixels of the low-resolution frames 804. The similarity metric can be based on only a portion of the data contained within each of the pixels of the low-resolution frames 804. For example, the temporal compressor 250 may only compare values within a given spectral frequency or color channel.

The similarity metric can include a comparison between neighboring values in a second data stream. For example, the autonomous system can collect a second data stream that includes speed data of the autonomous system. The second data stream can be time locked with the first data stream (e.g., the data stream 800 in FIG. 8) that includes the video data. The above-described event detector 112 can identify fluctuations in data streams that are related to the first data stream, which can indicate that neighboring values in the data streams are not similar to one another. For example, the event detector 112 can determine the delta between neighboring values, calculate the energy of the signal, or perform other calculations to determine a similarity metric of a data stream that includes speed values. The similarity metric can indicate when any of a plurality of time synchronized data streams (e.g., the data stream including the video or the data stream including the speed data) include a low similarity metric. Any of the above steps can be performed using the frames 802 of the data stream 800 rather than the low-resolution frames 804.

The method 700 can include comparing the similarity metric to a threshold (BLOCK 710). The temporal compressor 250 can compare the calculated similarity metric between two low-resolution frames 804 to determine whether the similarity metric is above a predetermined threshold (e.g., the two low-resolution frames 804 are similar and there is little change between the two low-resolution frames 804) or below the predetermined threshold (e.g., the two low-resolution frames 804 are different and there is change between the two resolution frames 804). If the similarity metric is high, the method 700 can continue to compare subsequent low-resolution frames 804. Once completed for each of the low-resolution frames 804, the compression engine 118 can identify each of the low-resolution frames 804 that have a relatively high degree of change between a neighboring low-resolution frame 804, which can indicate that the low-resolution frame 804 captures an event, such as movement. For example, and also referring to FIG. 8, the compression engine 118 can identify a plurality of low-resolution frames 804 that have a low similarity metric, as indicated by the shaded low-resolution frames 804. As illustrated in FIG. 8, the compression engine 118 can determine that several groupings of low-resolution frames 804 exist in the second data stream 806. For example, a first grouping starts at index 5 (e.g., low-resolution frame 804(5)), a second grouping starts at index 24 (e.g., low-resolution frame 804(24)), and a third grouping starts at index n−5 (e.g., low-resolution frame 804(n−5)).

The method 700 can include generating an image index (BLOCK 712). The compression engine 118 can save the index of the low-resolution frames 804 that are found to have a similarity metric below the predetermined threshold. The compression engine 118 can save the index information into the index file 254 saved in the database 114. For example, the compression engine 118 and referring to the above example illustrated in FIG. 8, the compression engine 118 can save the index 5, 24, and n−5 into an array of an index file 254. The compression engine 118 can save an index of each of the low-resolution frames 804 that have a similarity metric below the predetermined threshold into the index file 254. As the second data stream 806 is generated from the data stream 800 and includes the same number of frames at the same index location, the index values saved to the index file 254 can indicate which frames 802 contain low levels of similarity between neighboring frames 802. The compression engine 118 can also save the time information from the indexed low-resolution frames 804 or frames 802 to the index file 254. The time information saved to the index file 254 can enable a mapping between the time position of the compressed data stream's frames and the original location of the frame in the data stream 800. The compression engine 118 can save the index of each of the low-resolution frames 804 with a similarity metric below the threshold. For example, and referring to the example illustrated in FIG. 8, the index file 254 can include an index array of [5, 6, 7, 8, 9, 24, 25, 26, n−5, n−4, n−3, n−2, n−1, n].

The compression engine 118 can include index values that correspond to identified events as identified in data streams that are related to the compressed data stream. As described above, the event detector 112 can identify events in the data streams. For example, the events can be identified by fluctuations in speed or acceleration, the presence of objects in video data, or sections flagged by a user. As each of the data streams can be time locked with one another, the index values that correspond to the identified events can be saved to the index file 254. The compression engine 118 can save the index values that corresponds to low-resolution frames 804 that have a high similarity metric (e.g., a similarity metric that does not cross the predetermined threshold) because and event or low similarity value was identified in a related, time locked data stream. The index file 254 can include index values that can correspond to frames that have a low similarity metric when compared to their neighboring frames; index values that can correspond to changes or fluctuations in data streams time locked with the data stream being compressed; index values that can correspond to flagged events in the data stream being compressed or related, time locked data streams; or any combination thereof.

The compression engine 118 can store a predetermined number of index values corresponding to the frames before a regional crossing of the threshold by the similarity metric into the index file 254. For example, the compression engine 118 can store the index values for the low-resolution frames 804 corresponding to 30 seconds, 1 minute, 5 minutes, 10 minutes, 15 minutes, or 30 minutes worth of data prior to the regional crossing of the threshold by the similarity metric. For example, and also referring to FIG. 8, the compression engine 118 can save a predetermined number of the index values prior to low-resolution frame 804(5) (e.g., a regional crossing of the threshold by the similarity metric) to the index file 254. The compression engine 118 can store a predetermined number of index values corresponding to the frames after a regional crossing of the threshold by the similarity metric into the index file 254. For example, the compression engine 118 can store the index values for the low-resolution frames 804 corresponding to 30 seconds, 1 minute, 5 minutes, 10 minutes, 15 minutes, or 30 minutes worth of data after the regional crossing of threshold by the similarity metric. For low-resolution frames 804 that have a similarity metric below the threshold, the compression engine 118 may only store the index values of the low-resolution frames 804 into the index file 254 if a predetermined number of consecutive low-resolution frames 804 have a similarity metric below the predetermined threshold.

The method 700 can include generating a compressed data scream (BLOCK 714). The compression engine 118 can generate the compressed data stream by selecting the frames 802 from the data stream 800 that correspond to the index values saved to the index file 254. The selected frames 802 can be saved to the compressed data stream. The unselected frames 802 can be discarded or otherwise not included in the compressed data stream. As illustrated in FIG. 8, the compressed data stream 808 can include the frames 802 from the data stream 800 that correspond to the low-resolution frames 804 that were identified as having a similarity metric below the predetermined threshold. For example, the compressed data stream 808 can include a first grouping of frames 802 that begin with frame 802(5), a second grouping that begins with the frame 802(24), and a third grouping that beings with the frame 802(n−5). The frames 802 in the compressed data stream 808 can have the same resolution as the frames 802 in the data stream 800. The selected frames of the compressed data stream can be saved sequentially and re-indexed such that the frame 802(5), for example, would be the first frame of the compressed data stream 808 and frame 802(24) would become the sixth frame of the compressed data stream 808. The timing information saved into the index file 254 can enable the frames of the compressed data stream to be synchronized with other data streams. For example, when playing back the video of the compressed data stream, the video play back device can hold on the last frame of a grouping for the amount of time indicated as occurring between the last frame of the grouping and the first frame of the next grouping.

C. Example Interface for Reviewing Event Information in Automated Robotic Systems As described above, the remote data processing system 102 and client device 122 can include an interface 124. The interface 124 of either of the devices can display data and other information to the user. For example, the interface 124 can generate a graphical interface that is provided to the user for display. The interface may be part of a web interface that the user accesses through a web page. The interface may be part of an application executed by the client device 122, for example, that is displayed to the user.

As an overview, the interface can include a dashboard view, an inbox view, an event triage view, and a session triage view. The inbox view can present the user with newly identified events or newly tagged data streams or portions thereof. The inbox view can display metadata about the data streams or autonomous system that generated the data streams, location information of the autonomous system, and indications of the tags applied to the data streams.

Figure 9:
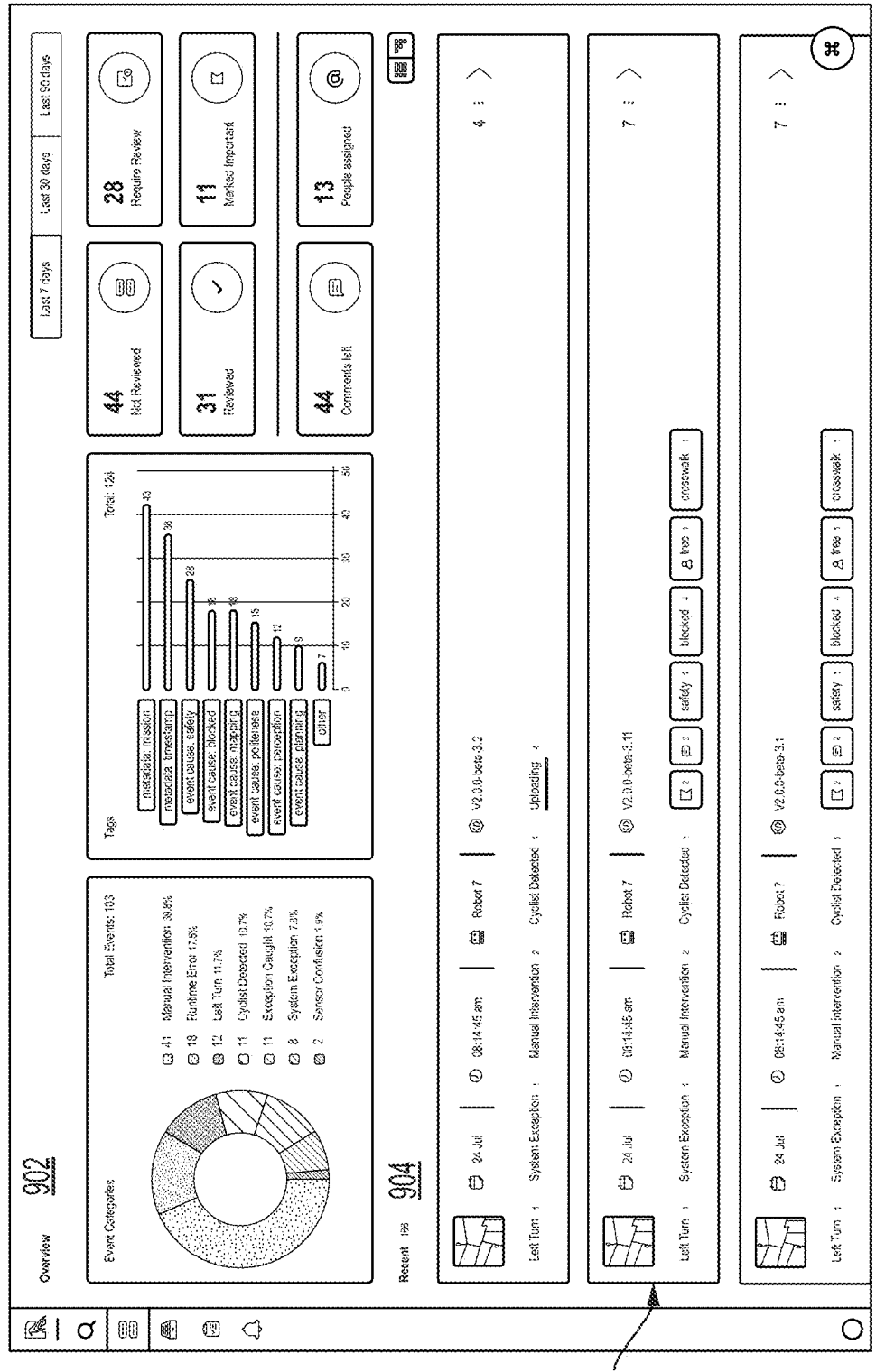
FIGS. 9-13 illustrate views of example graphical interfaces of the system illustrated in FIG. 1.

FIG. 9 illustrates an example view of a graphical interface 900 generated by the interface 124. The graphical interface 900 can be a dashboard view and can include an overview section 902. The overview section 902 can include one or more charts, plots, or graphs. For example, the overview section 902 can include a pie or donut chart that identifies a count of each events detected or identified in the data streams over a given period of time. The overview section 902 can include a bar chart that indicates the number of times each of a plurality of tags was applied to the data streams over the given period of time. The overview section 902 can include additional dashboard information that displays the counts of customizable information. For example, the additional dashboard information can include a count of the events not reviewed, a count of the events needing review, a count of the events reviewed, a count of the events flagged, a count of comments, or a count of the users assigned to review the data streams.

The graphical interface 900 can include a recent section 904. The recent section 904 can include representations of a plurality of recent events 906. The representation of the recent events 906 can include information about each of the events. The information can include, for example, a thumbnail image of a map indicating where the event occurred, or a path taken by the autonomous system. The information can include a date and time the event occurred. The information can include icons that indicate if the event is flagged or if tags are applied to the event. Clicking on the representation of the recent event 906 can provide additional information about the event.

Figure 10:
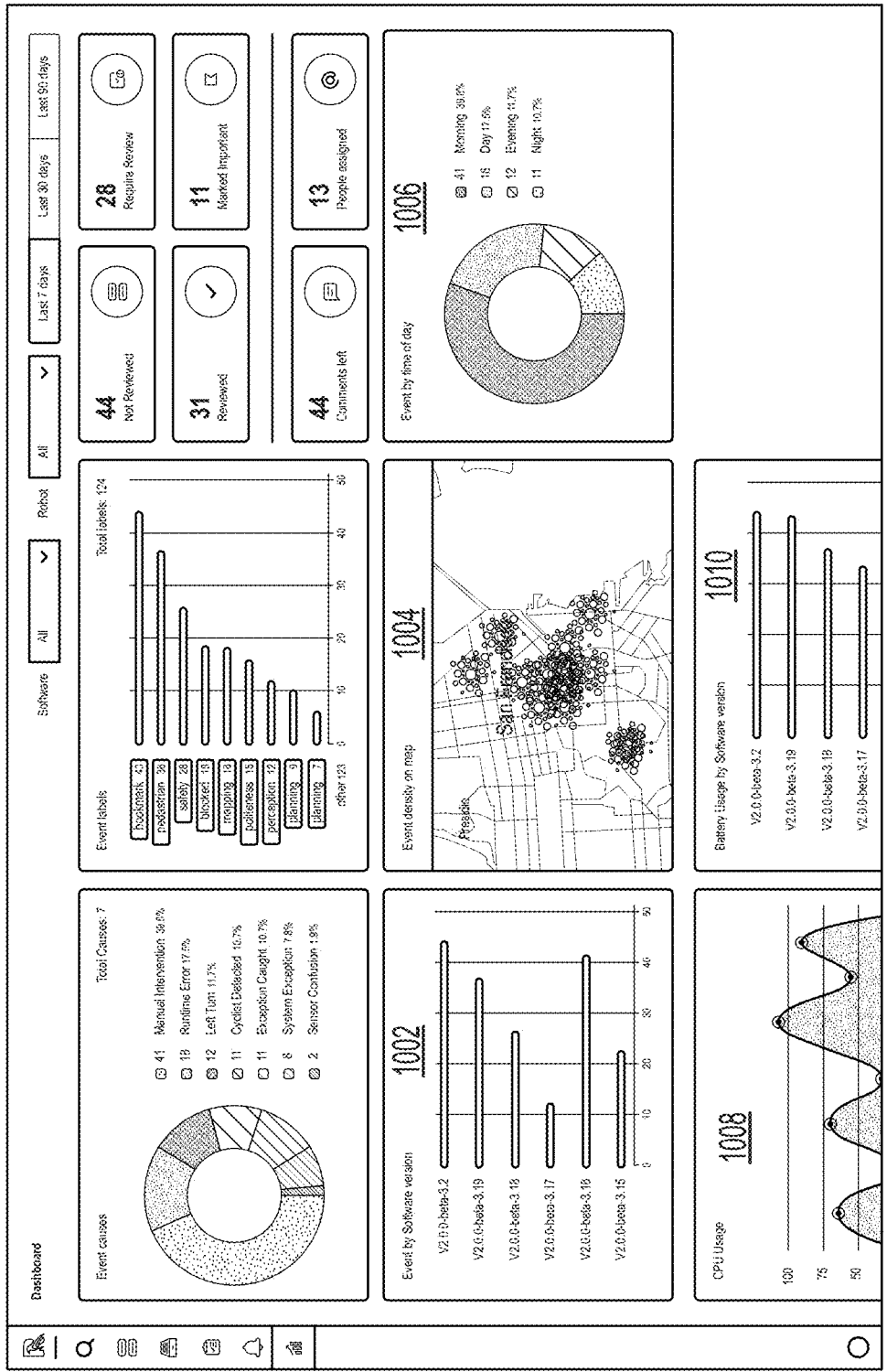

FIG. 10 illustrates an example view of a graphical interface 1000 generated by the interface 124. The graphical interface 1000 can be another example dashboard view. The graphical interface 1000 can include additional plots and information about one or more autonomous systems. For example, the graphical interface 1000 can include a bar plot 1002 that indicates the number of events for each of the software versions deployed on a fleet of autonomous systems. The plot 1004 illustrates a heat map or a location where each of the events occurred on a map. The plot 1006 illustrates a donut chart of when during the day the events occurred. The plot 1008 illustrates a plot of the CPU usage. The plot 1008 can indicate the CPU usage the remote data processing system 102 or the autonomous system 104, for example. The plot 1010 illustrates a bar plot that indicates the battery power usage for each of the software versions deployed on a fleet of autonomous systems.

Figure 11:
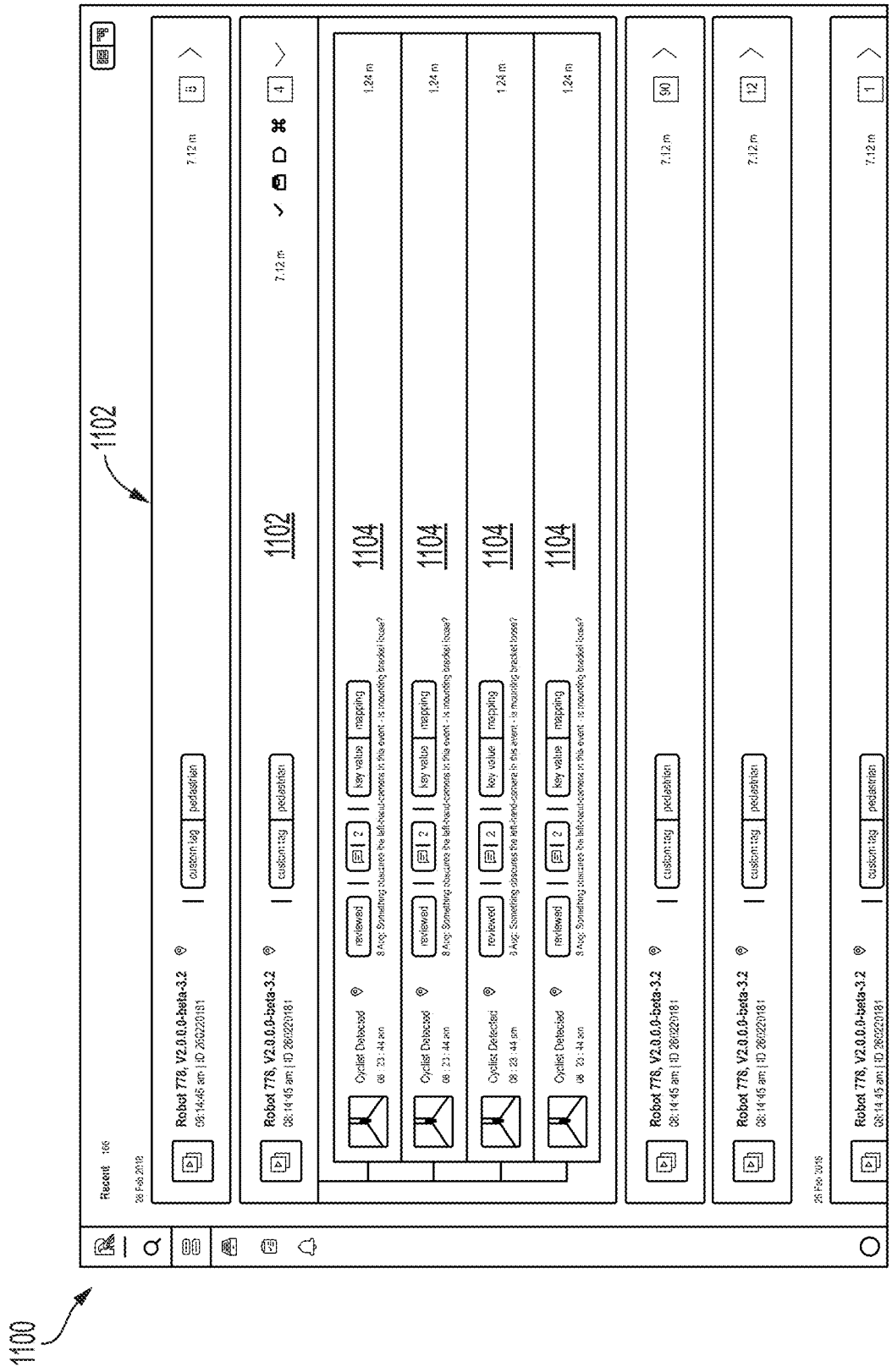

FIG. 11 illustrates an example view of a graphical interface 1100 generated by the interface 124. The graphical interface 1100 is an example inbox view. The inbox view can include a representation of a plurality of recently received sessions 1102. The sessions 1102 can be displayed in an order based on the time the session occurred or the events within the session occurred. For example, the newest sessions 1102 can be placed at the top of the list. In another example, the newest sessions 1102 can be placed at the bottom of the list with the older sessions 1102 at the top of the list. Selecting a session 1202 can expand the session to reveal the events 1104 that occurred during the session. Each representation of the sessions 1102 can include icons that can indicate whether the event 1102 has been reviewed, whether comments have been posted on the event, and an indication of any tags that were applied to the event 1102.

Figure 12:
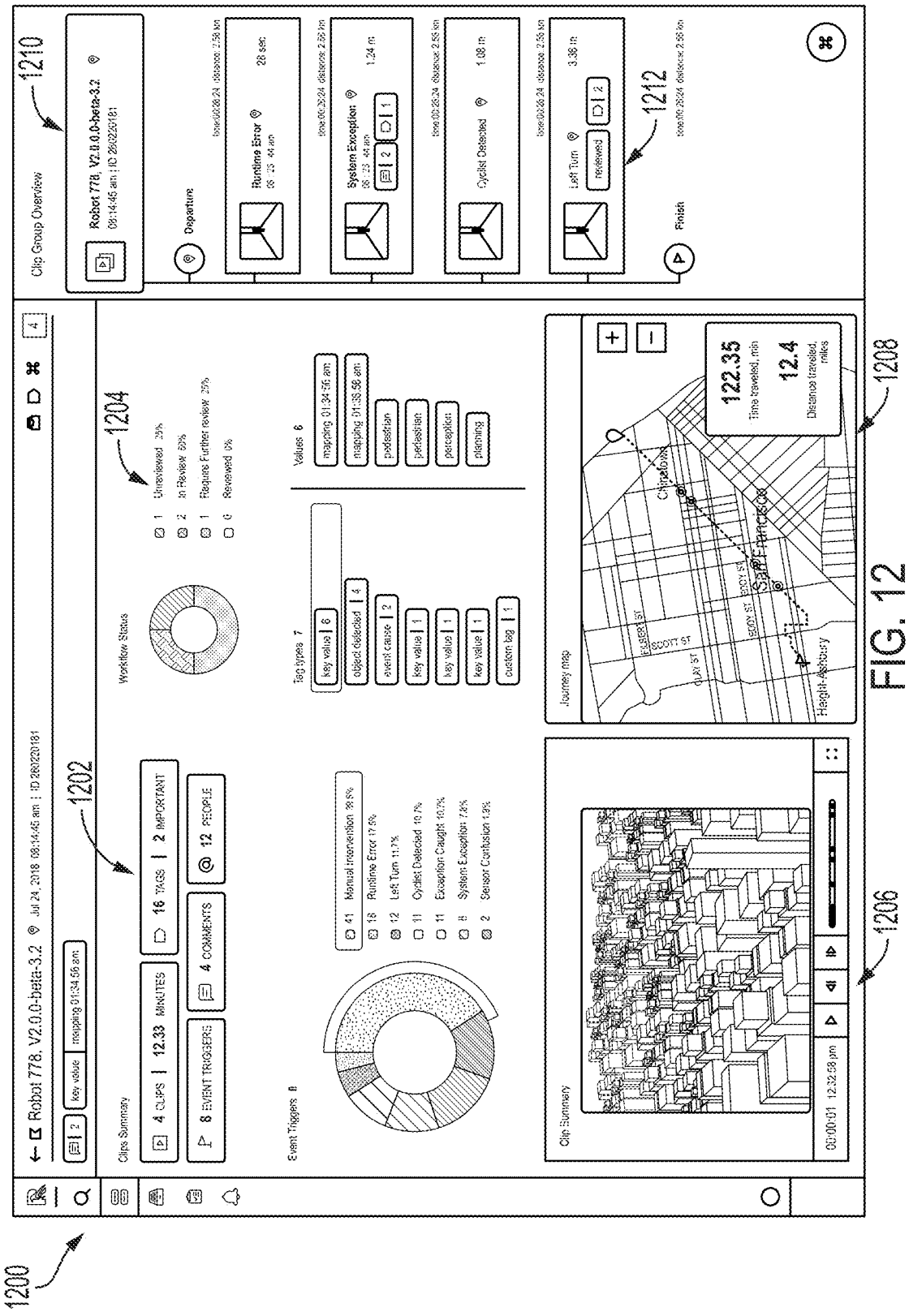

FIG. 12 illustrates an example view of a graphical interface 1200 generated by the interface 124. The graphical interface 1200 is an example of a session triage interface. The session triage interface can display information to the user about a single session of an autonomous system. For example, the autonomous system can be an autonomous vehicle programmed to drive from point A to point B. The session can be a single run of the autonomous vehicle from point A to point B. The graphical interface 1200 can include a summary section 1202 that can provide an overview of the session. For example, the summary section 1202 can include a count of the number of events, clips, tags, comments, and people associated with the session. The overview section 1202 can include an indication of the length of time of the session.

The graphical interface 1200 can include a plurality of plots 1204. The plots 1204 can include a plot indicating the status of the review of the session. For example, the plot can be a donut chart indicating how many of the events were reviewed, how many are pending review, and how many require further review. The plots 1204 can include a plot indicating the number and type of events that occurred during the session. For example, the plot can be a donut plot that indicates how many of each event type occurred during the session. The plots can be word clouds or rankings of the tags applied to the events. The graphical interface 1200 can include a clip summary 1206 that can include video clips from the session. The graphical interface 1200 can include a map 1208 that can indicate the path traveled by the autonomous system during the session. The graphical interface 1200 can include a listing 1210 of the events 1212 that occurred during the session. The listing 1210 can display the events 1212 in a timeline structure. Each of the events 1212 can be selectable to take the user to an event triage interface.

Figure 13:
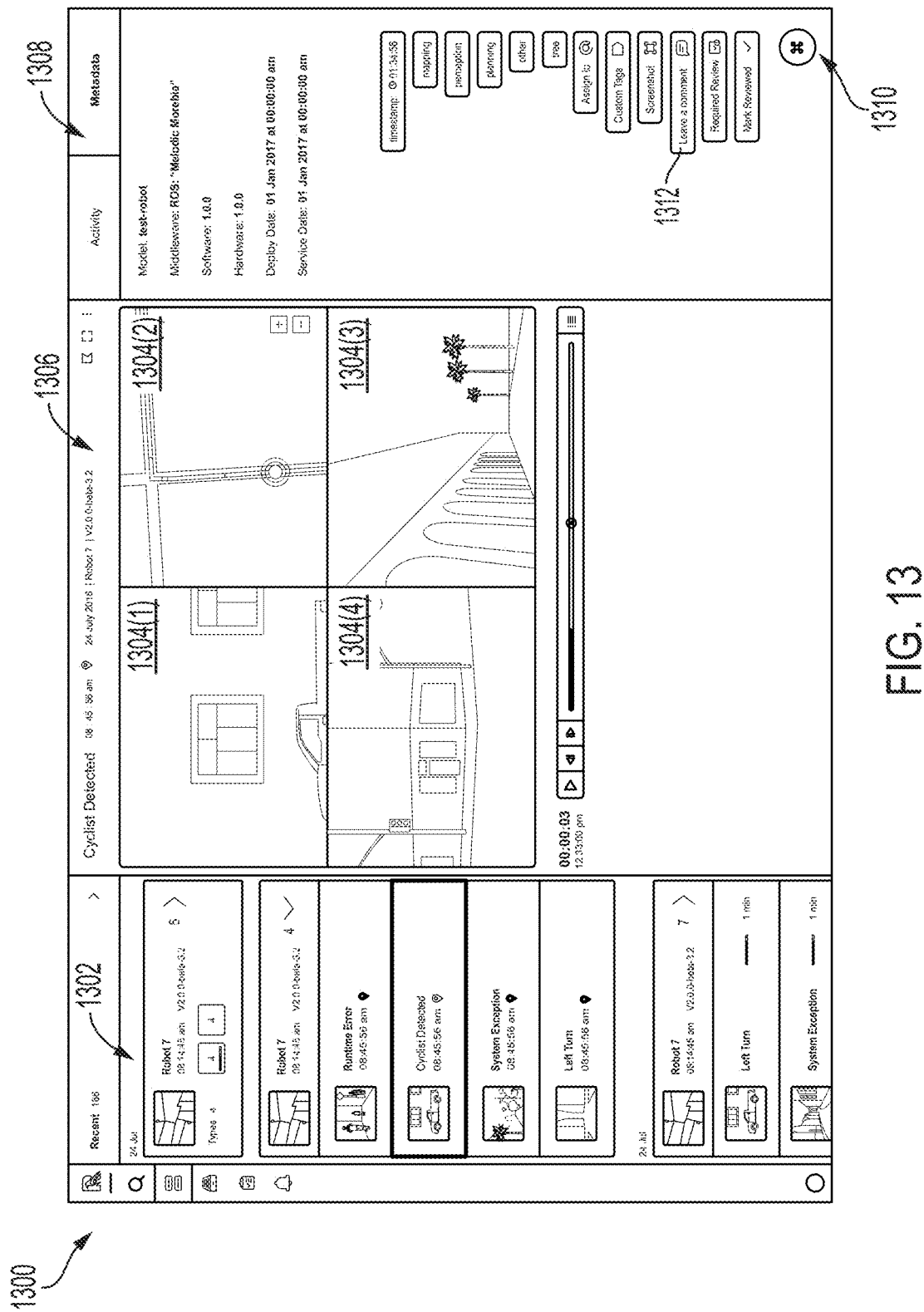

FIG. 13 illustrates an example view of a graphical interface 1300 generated by the interface 124. The graphical interface 1300 is an example of an event triage interface. The event triage interface can provide additional information about one or more events within a session. The event triage interface can include a listing 1302 of other events. The events in the listing 1302 can be related to the event displayed in the event triage interface. For example, the events may be other events from the same session, same autonomous system, of events of the same type. The event triage interface can include a main section 1306 that can display data streams 1304(1)-1304(4), which can generally be referred to as data streams 1304. The number of displayed data streams 1304 can be configured by the user. The data streams 1304 can include one or more compressed data streams that can be compressed using the methods described herein. The main section 1306 can display more than or fewer than four data streams 1304. The data streams 1304 can be synchronized or otherwise time locked with one another. When time locked, the main section 1306 can display data from the same time point from each of the respective data streams 1304. The event triage interface can also include a supplemental data section 1308. The supplemental data section 1308 can display metadata or other data associated with the data displayed in the main section 1306. The supplemental data section 1308 can display metadata or other data associated with the event or session.

The graphical interface 1300 (and any of the graphical interfaces) can include a command palette 1310. The command palette 1300 can have a contracted view and an expanded view. As illustrated in FIG. 13, the command palette 1300 is in the expanded view. When in the expanded view, the command palette 1300 can include a plurality of selectable options 1312. In the contracted view, the command palette 1300 does not display the options 1312. The options 1312 can include indications of tags. Selecting one or more of the indications of the tags can cause the system to apply the tag to the even. The options 1312 can include actions that can be taken on the event or information displayed by the graphical interface. For example, the actions can cause the system to assign the event to a given user, generate and apply a custom tag, generate a screenshot, open a field where a comment can be entered, mark the event as reviewed, or mark the event as requiring review.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to identify and review event information in data streams of automated robotic systems, comprising:
an autonomous robotic system comprising:
a plurality of sensors; and
a data processing system comprising a memory and one or more processors to:
receive a first data stream from a first of the plurality of sensors;
receive a second data stream from a second of the plurality of sensors;
determine a usage parameter of the data processing system falls below a predetermined threshold;
responsive to the usage parameter of the data processing system falling below the predetermined threshold:
detect an event in the first data stream;
extract a portion of the first data stream covering the event and a portion of the second data stream covering the event;
generate a third data stream based on the portion of the first data stream covering the event and the portion of the second data stream covering the event; and
transmit, responsive to the usage parameter of the data processing system falling below the predetermined threshold and based on detection of the event in the first data stream, the third data stream to a remote data processing system.

2. The system of claim 1, further comprising the one or more processors to:
determine a network parameter of a network between the autonomous robotic system and the remote data processing system; and
transmit the third data stream to the remote data processing system based on the network parameter being above a second threshold.

3. The system of claim 1, wherein the usage parameter comprises at least one of a current status of the autonomous robotic system, a processor utilization value, available memory, or power level.

4. The system of claim 1, wherein the usage parameter indicates a predicted usage parameter for a predetermined time in the future.

5. The system of claim 1, further comprising the one or more processors to:
compress the portion of the first data stream covering the event;
compress the portion of the second data stream covering the event; and
generate the third data stream based at least on the compressed portion of the first data stream covering the event and the compressed portion of the second data stream covering the event.

6. The system of claim 1, further comprising the one or more processors to:
sync the first data stream to a master clock; and
sync the second data stream to the master clock.

7. The system of claim 1, wherein the third data stream comprises a visualization based on the portion of the first data stream covering the event and the portion of the second data stream covering the event.

8. The system of claim 1, wherein the portion of the first data stream comprises a first portion of the first data stream prior to the event and a second portion of the first data stream after the event.

9. The system of claim 1, further comprising the one or more processors to transmit the first data stream and the second data stream to the remote data processing system.

10. The system of claim 1, further comprising the one or more processors to:
receive a fourth data stream from a client device; and
generate the third data stream based on the fourth data stream.

11. A method to identify and review event information in data streams of automated robotic systems, comprising:
receiving, by a data processing system of an autonomous system, a first data stream from a first of a plurality of sensors;
receiving, by the data processing system, a second data stream from a second of the plurality of sensors;
determining, by the data processing system, that a usage parameter of the autonomous system falls below a predetermined threshold;
responsive to the usage parameter of the data processing system falling below the predetermined threshold:
detecting an event in the first data stream;
extracting a portion of the first data stream covering the event and a portion of the second data stream covering the event;
generating a third data stream based on the portion of the first data stream covering the event and the portion of the second data stream covering the event; and
transmitting, responsive to the usage parameter falling below the predetermined threshold and based on the detecting the event in the first data stream, the third data stream to a remote data processing system.

12. The method of claim 11, further comprising:
determining a network parameter of a network between the autonomous system and the remote data processing system; and
transmitting the third data stream to the remote data processing system based on the network parameter being above a second threshold.

13. The method of claim 11, wherein the usage parameter comprises at least one of a current status of the autonomous system, a processor utilization value, available memory, or power level.

14. The method of claim 11, wherein the usage parameter indicates a predicted usage parameter for a predetermined time in the future.

15. The method of claim 11, further comprising:
compressing the portion of the first data stream covering the event;
compressing the portion of the second data stream covering the event; and
generating the third data stream based at least on the compressed portion of the first data stream covering the event and the compressed portion of the second data stream covering the event.

16. The method of claim 11, further comprising:
syncing the first data stream to a master clock; and
syncing the second data stream to the master clock.

17. The method of claim 11, wherein the third data stream comprises a visualization based on the portion of the first data stream covering the event and the portion of the second data stream covering the event.

18. The method of claim 11, wherein the portion of the first data stream comprises a first portion of the first data stream prior to the event and a second portion of the first data stream after the event.

19. The method of claim 11, further comprising transmitting the first data stream and the second data stream to the remote data processing system.

20. The method of claim 11, further comprising:
 receiving a fourth data stream from a client device; and
 generating the third data stream based on the fourth data stream.

\* \* \* \* \*